United States Patent [19]
Hamilton

[11] Patent Number: 5,371,787
[45] Date of Patent: Dec. 6, 1994

[54] MACHINE ANSWER DETECTION

[75] Inventor: Chris A. Hamilton, Montclair, N.J.

[73] Assignee: Dialogic Corporation, Parsippany, N.J.

[21] Appl. No.: 24,409

[22] Filed: Mar. 1, 1993

[51] Int. Cl.$^5$ .............................................. H04M 1/00
[52] U.S. Cl. .................................... 379/386; 379/92; 379/100; 379/216; 379/104; 379/69; 379/97
[58] Field of Search ..................... 379/386, 92, 88, 69, 379/97, 100, 216, 104; 375/104

[56] References Cited

U.S. PATENT DOCUMENTS

| | | | |
|---|---|---|---|
| 4,160,125 | 7/1979 | Bower et al. | 379/386 |
| 4,201,896 | 5/1980 | Bower et al. | 370/372 |
| 4,356,348 | 10/1982 | Smith | 379/386 |
| 4,405,833 | 9/1983 | Cave et al. | 379/386 |
| 4,941,168 | 7/1990 | Kelly | 379/88 |
| 5,023,906 | 6/1991 | Novas | 379/386 |
| 5,070,526 | 12/1991 | Richmond et al. | 379/372 |
| 5,151,922 | 9/1992 | Weiss | 375/104 |
| 5,179,585 | 1/1993 | MacMillan et al. | 379/88 |

Primary Examiner—James L. Dwyer
Assistant Examiner—Jacques M. Saint-Surin
Attorney, Agent, or Firm—Michael B. Einschlag

[57] ABSTRACT

A detector to indicate if a telephone call was answered by an answering machine or a live person includes (to analyze frames): a click detector; a ring detector; a voice detector; an energy detector; and a controller. The controller routes to: a voice analyzer if voice occurred; a ring analyzer if ring started, continues, or ended; a noise detector if there is neither ring nor voice; a click analyzer if a click occurred; an answer analyzer if ring did not start in the frame; and a silence analyzer. The noise detector detects noise; the ring analyzer detects start time, end time, and length of ring; the click analyzer detects click time; the answer analyzer detects call answer time; the silence analyzer detects silence and the time of predetermined lengths of silence; and the voice analyzer detects the first frame of voice and routes to an on-first voice analyzer or to an after-first voice analyzer. Lastly, the on-first voice analyzer determines if the call was answered by an answering machine and routes to a reporter and the after-first voice analyzer determines if the telephone call was answered by an answering machine or a live person and routes to the reporter.

15 Claims, 12 Drawing Sheets

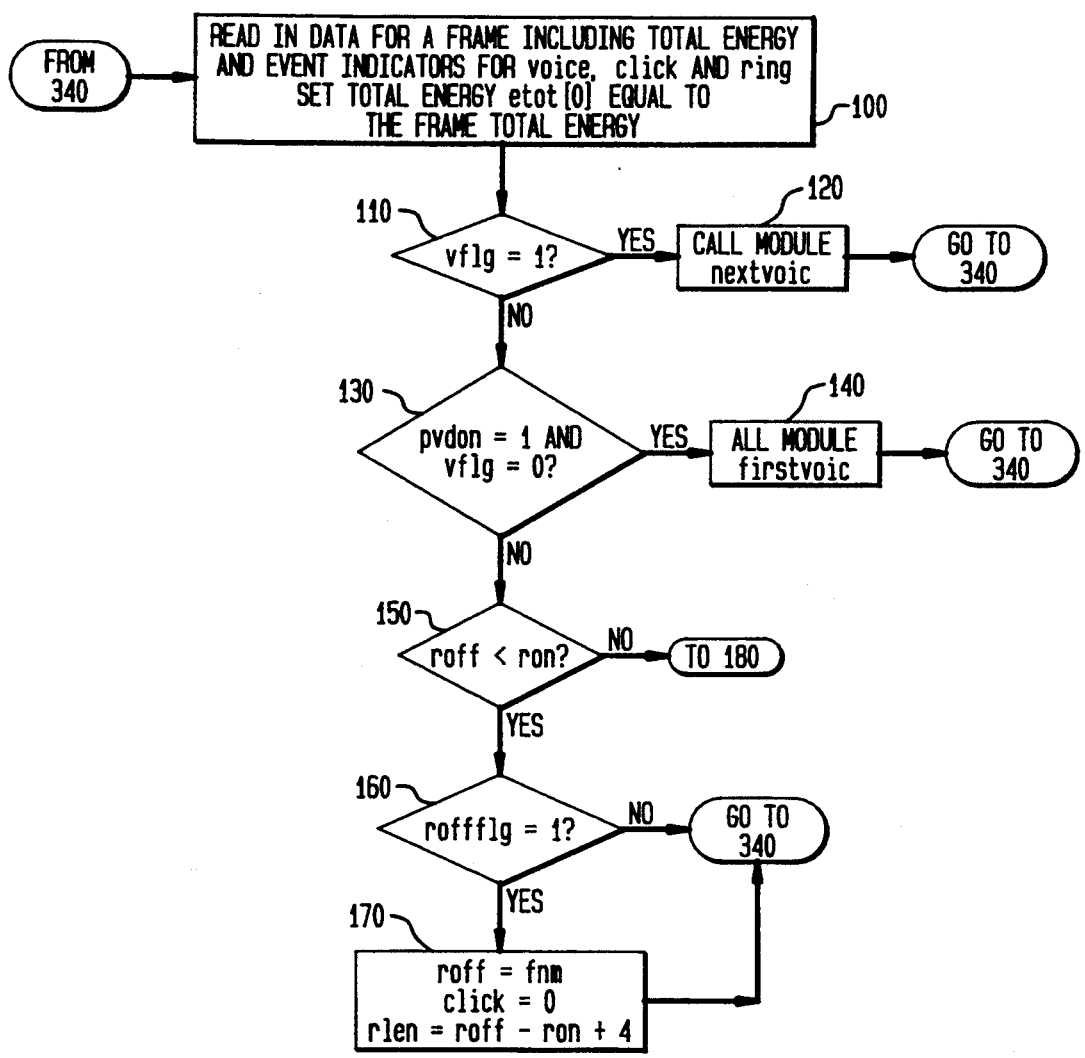
FIG. 3A1

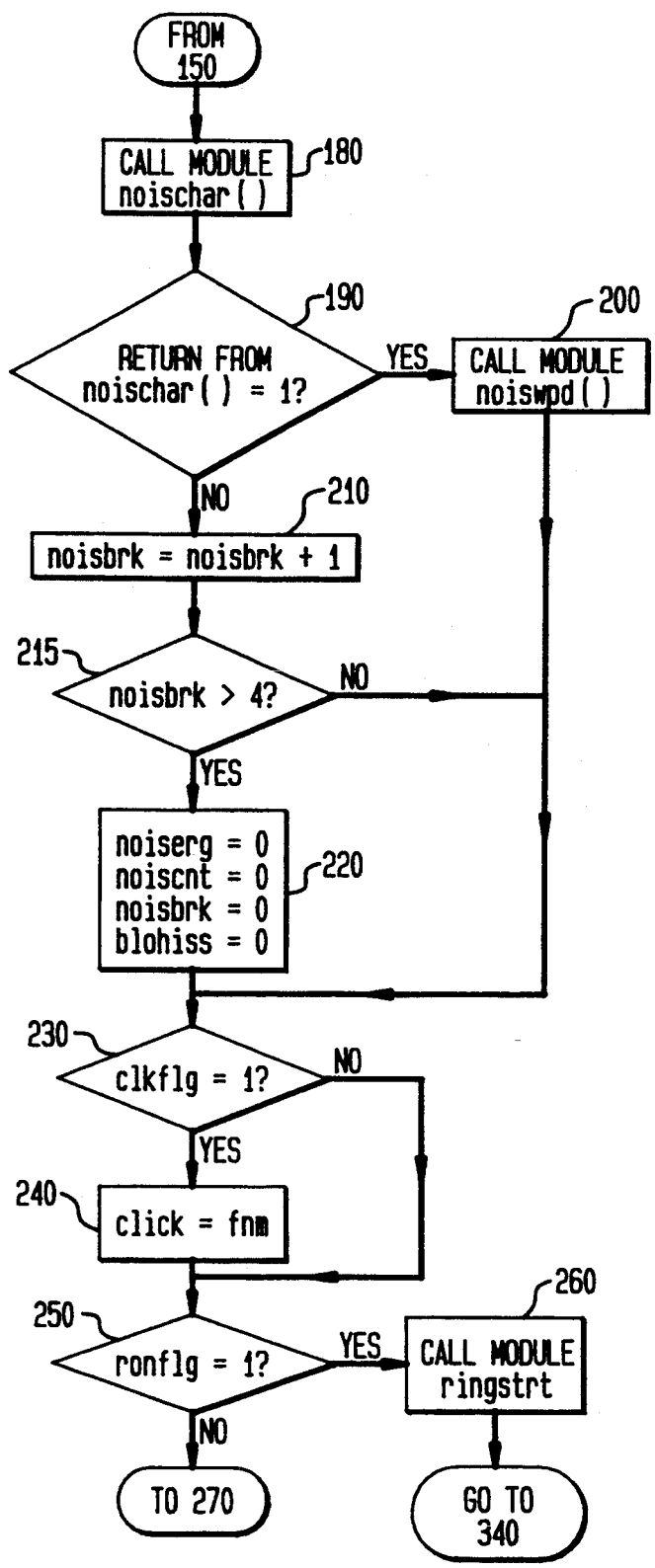
FIG. 3A2

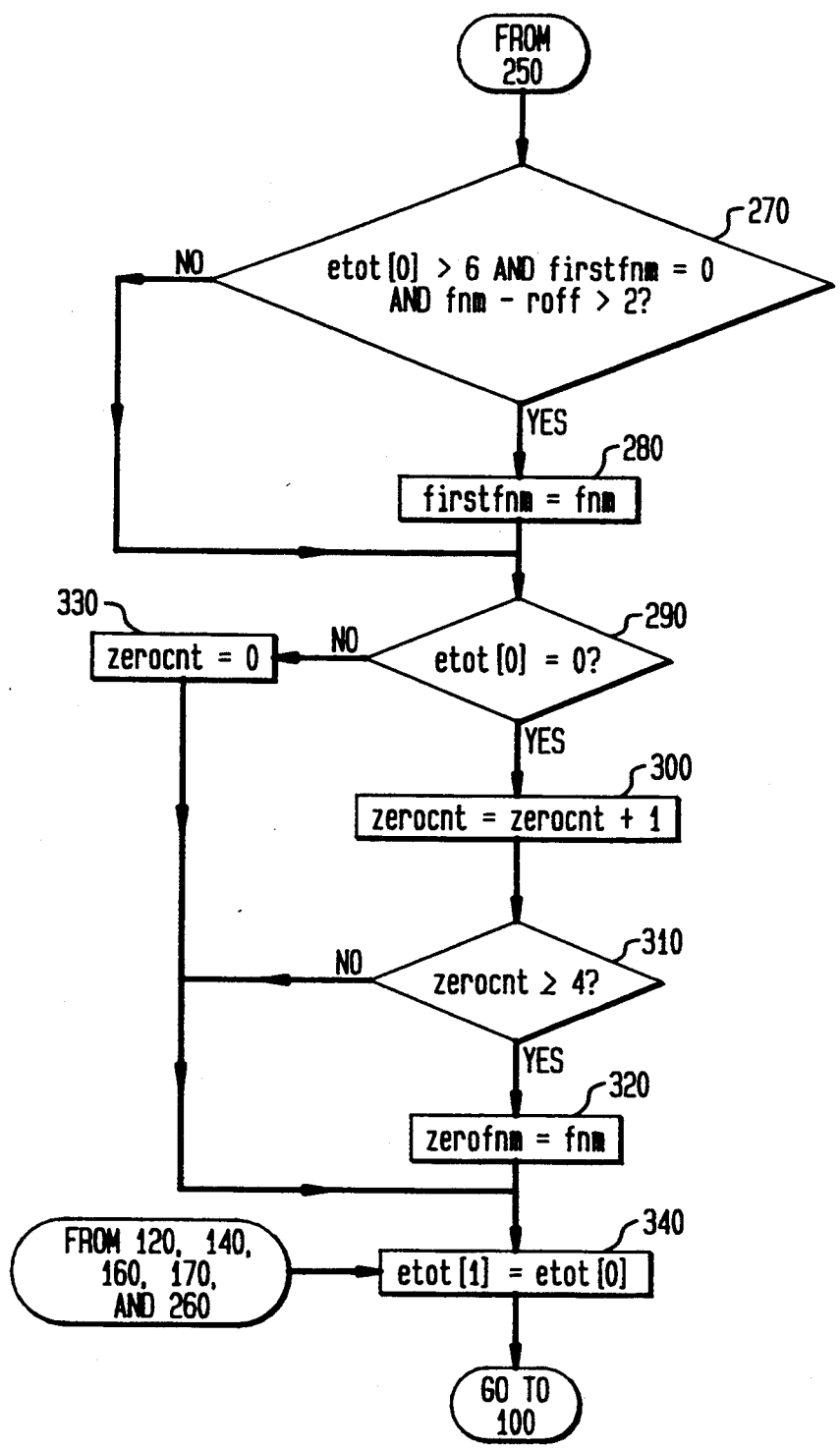
FIG. 3A3

MACHINE ANSWER DETECTION

TECHNICAL FIELD OF THE INVENTION

The present invention pertains to the field of telephony and, in particular, to method and apparatus for detecting whether a telephone call has been answered by a machine to distinguish between calls which are answered by a live person and those which are answered by a machine and, specifically, by an answering machine.

BACKGROUND OF THE INVENTION

It is known in the art that automated systems have been developed for use in telecommunications applications wherein the automated systems will place a telephone call for the purpose, for example, of connecting a business agent at one end with a member of the public at the other end. However, it is becoming increasingly more common for members of the public to utilize machines such as answering machines to respond to incoming calls for the purpose of screening calls, taking messages, blocking calls, and so forth. As those in the art readily appreciate, if the automated system connects a business agent to a machine, there is a great loss in efficiency in the use of the services of the business agent.

Thus, there is need in the art for method and apparatus for detecting whether a telephone call set up by an automated telephony system has been answered by a machine and, in particular, by an answering machine.

SUMMARY OF THE INVENTION

Embodiments of the present invention advantageously solve the above-identified need in the art by providing method and apparatus for detecting whether a telephone call set up, for example, by an automated telephony system has been answered by a machine and, in particular, by an answering machine.

In particular, an embodiment of the present invention comprises: (A) a click detector, responsive to a telephone signal generated during a telephone call, for detecting a click in a predetermined period of time referred to as a frame and for storing a click indication thereof in a store; (B) a ring detector, responsive to the telephone signal, for detecting whether a ring event started, continues, or ended in the frame and for storing a ring indication thereof in the store; (C) a voice detector, responsive to the telephone signal, for detecting whether a voice event occurred in the frame and for storing a voice indication thereof in the store; (D) an energy detector means, responsive to the telephone signal, for: (a) determining a measure of the total energy of the telephone signal in the frame and a measure of energy concentration of the signal referred to as broad; (b) storing the measures in the store; and (c) transmitting a signal to a controller means; (E) the controller is apparatus, responsive to the signal from the energy detector, for: (a) obtaining the voice indication from the store and, if a voice event occurred, transmitting a signal to a voice analyzer; (b) obtaining the ring indication from the store and, if a ring event started, continues, or ended in the frame, transmitting a signal to a ring analyzer; (c) if the frame is not inside a ring event or a voice event, transmitting a signal to a noise detector; (d) obtaining the click indication from the store and, if a click occurred in the frame, transmitting a signal to a click analyzer; (e) if the ring indication does not indicate that a ring event started in the frame, transmitting a signal to an answer analyzer; and (f) transmitting a signal to a silence analyzer; wherein: the noise detector is apparatus, responsive to the signal from the controller and information obtained from the store, for detecting whether the telephone signal during the frame is noise and, if so, for storing noise information in the store; the ring analyzer is apparatus, responsive to the signal from the controller and information obtained from the store, for storing an indication of time a ring event started in the store, for storing an indication a ring event ended in the store, and for storing an indication of the length of a ring event in the store means; the click analyzer is apparatus responsive to the signal from the controller and information obtained from the store, for storing an indication of the time a click was detected in the store; the answer analyzer is apparatus, responsive to the signal from the controller and information obtained from the store, for detecting an indication of the time at which the telephone call is answered and for storing the indication of the time in the store; the silence analyzer is apparatus, responsive to the signal from the controller and information obtained from the store, for detecting silence, for determining an indication of the time at which a predetermined time length of silence occurred, and for storing the indication of the time in the store; and the voice analyzer is apparatus, responsive to the signal from the controller and information obtained from the store, for determining whether the frame is the first frame in which a voice event has occurred and, if so, for transmitting a signal to an on-first voice analyzer and, if not, for transmitting a signal to an after-first voice analyzer; wherein: the on-first voice analyzer is apparatus, responsive to the signal from the controller and information obtained from the store, for detecting whether the telephone call was answered by an answering machine and, if so, for transmitting a signal to a reporter; and the after-first voice analyzer is apparatus, responsive to the signal from the controller and information obtained from the store, for determining whether the telephone call was answered by an answering machine or a live person and for transmitting a signal indicative thereof to the reporter; wherein the reporter is apparatus, responsive to signals from the on-first voice analyzer and the after-first voice analyzer, for generating a signal indicating whether the telephone call has been answered by an answering machine or by a live person.

BRIEF DESCRIPTION OF THE DRAWING

A complete understanding of the present invention may be gained by considering the following detailed description in conjunction with the accompanying drawing, in which:

FIGS. 3A–3I show a flow chart of a microprocessor program which forms part of the preferred embodiment of the inventive apparatus shown in FIG. 1.

DETAILED DESCRIPTION

Figure 1:
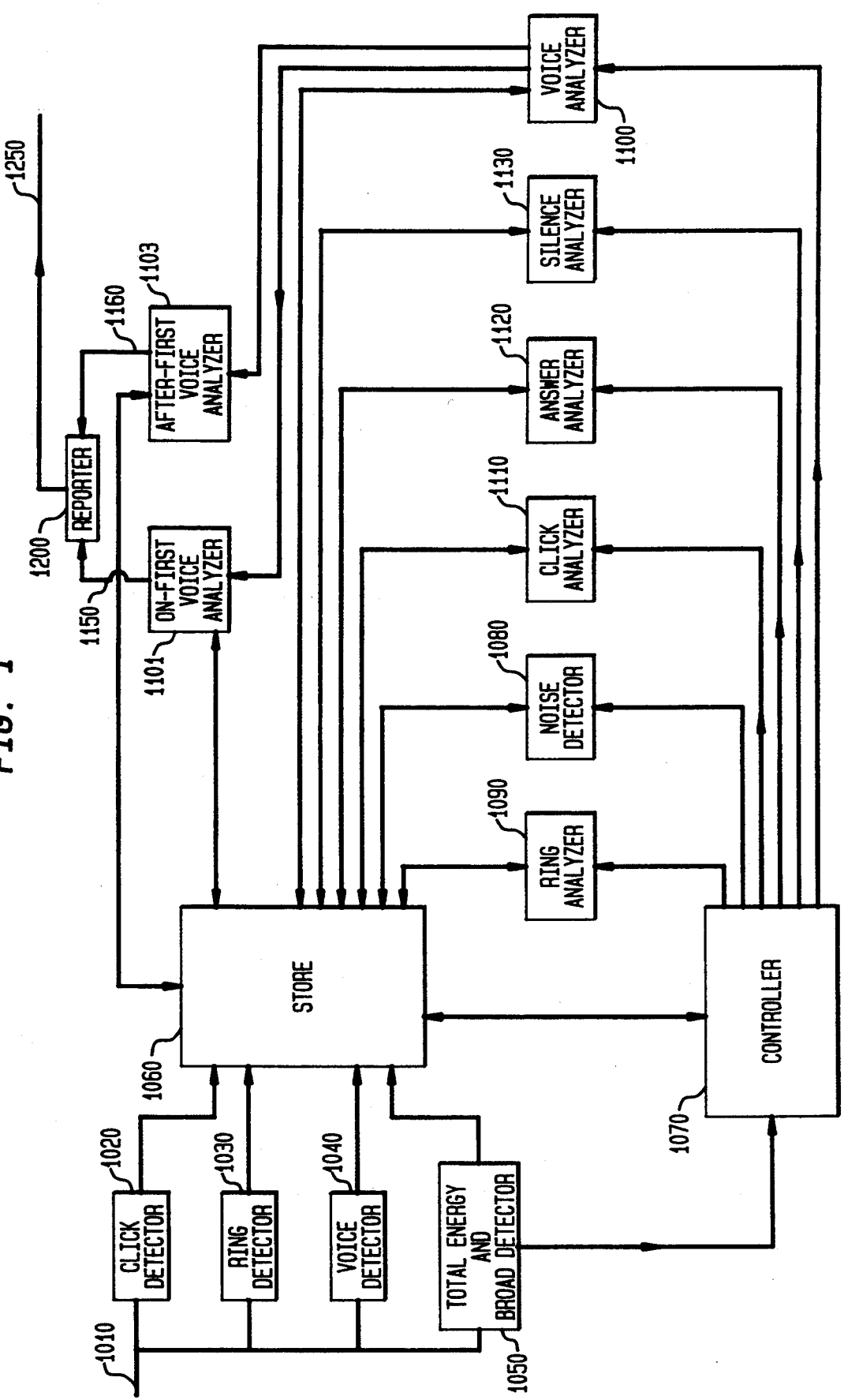
FIG. 1 shows a block diagram of an embodiment of the present invention for detecting the connection of a telephone call to a machine and, in particular, to an answering machine.

Embodiments of the present invention advantageously solve the above-identified need in the art by providing method and apparatus for detecting whether a telephone call set up, for example, by an automated telephony system has been answered by a machine and, in particular, by an answering machine. Embodiments of the present invention base a detection decision on time and frequency characteristics of the call connection, signal energy measured after receiver pickup, and vocal answer length. In accordance with the present invention, a telephone call is monitored through several rings and for a short time after a voice is detected. Although some telephone calls can be analyzed quickly, in most cases, an analysis of the voice response is required.

In accordance with the present invention, five measures of an incoming telephone signal are analyzed to determine whether a telephone call has been answered by an answering machine or by a live person. The five measures are: (a) "cvtim"—the length of time which elapses from "pickup connect" to the beginning of voice; 1b) noise block energy—the total energy of a block of noise which occurs just prior to the beginning of voice; (c) noise block frame count—the total number of frames of a block of noise which occurs just prior to the beginning of voice where each frame has a total energy below a predetermined level referred to as a "hiss" level; (d) zero energy count—an indication of the occurrence of silence prior to the beginning of voice; and (e) "answersize"—the length of time which elapses from the beginning of voice to the end of voice for an initial voice response to the telephone call.

In accordance with the present invention, cvtim is analyzed because I have discovered that a person will typically begin to speak within approximately 0.5 sec of the time the person picks up a telephone. In addition, I have discovered that an answering machine will typically take a longer time to begin playing a pre-recorded prompt. Therefore, in accordance with the present invention, if cvtim is greater than a predetermined maximum, "maxvcvth", there is a substantial probability that the answer was provided by an answering machine. However, in order to provide this assessment, it is preferable that cvtim be measured with an accuracy of about 0.1 sec. Further, I have discovered that detecting a break in ring cadence will not provide this accuracy. As a result, in accordance with the present invention, the time of connection is determined using three different methods. In the first method, the length of each ring is measured as it is received. If a ring, other than the first ring, is determined to be shorter than a predetermined minimum length, then the moment of connection is taken to be the moment at which the ring ended. In the second method, the moment of connection is taken to be the time at which the signal, lacking the characteristics of a ring, first rises above a predetermined energy threshold, i.e., this being the first significant audio after the last ring. In the third method, click detection is utilized. If the time between first significant audio after the last ring and first voice is above a predetermined threshold and a click was detected after the last ring, then the moment of connection is taken to be the time at which the click was detected. Finally, if a short ring is not detected before voice begins and neither significant audio nor a click is detected before voice begins, cvtim is not utilized in further analysis.

In accordance with the present invention, noise energy which occurs just prior to the beginning of voice is analyzed because I have discovered that answering machines typically play a short segment of noise prior to the beginning of a pre-recorded speech. In addition, I have discovered that a telephone call which is answered by a live person usually has low background noise. Thus, in accordance with the present invention, noise just prior to voice is detected, without including any of the voice energy or telephone pickup clicks. In accordance with the present invention, a predetermined period of time referred to as a frame is characterized as being comprised of noise if a measure of the total energy of the frame is too low to be voice or a tone or if a measure of energy concentration of the signal referred to as broad is too low to be a tone. In order to make this determination, in accordance with the present invention, a continuous block of noise is accumulated and analyzed—in the preferred embodiment of the present invention the block comprises eight (8) frames. Further, a block is characterized by the sum of the total energy of all of the frames in the block, i.e., noise block energy, and the number of frames in the block wherein the energy of the frame is below a predetermined energy level referred to as the "hiss" level, i.e., noise block frame count. Further, in accordance with the present invention, several of the most recent blocks of noise are stored—in the preferred embodiment of the present invention the number of blocks utilized for the historical analysis is three (3) blocks. Then, when the onset of voice is detected, the three most recent blocks of noise are examined and the most representative one is chosen as the best noise block in a manner which will be described in detail below. Next, the features of this best block, i.e., the noise block energy and the noise block frame count, are utilized in subsequent tests which depend on pre-voice noise in a manner which will be described in detail below.

In accordance with the present invention, zero energy count is analyzed because I have discovered that if a number of consecutive zero energy frames occur prior to the onset of voice, there is a greater weight that can be assigned to the possibility that the answer was provided by a live person. Of course those of ordinary skill in the art understand that although I have utilized the term zero energy, I mean an amount of energy which is below a predetermined, and typically small, threshold. Thus, in accordance with the present invention, each occurrence of zero energy results in the incrementing of a counter. If at least a predetermined number of consecutive zero energy frames occurs, the frame number of the zero occurrence is stored. Finally, if the onset of voice occurs within a predetermined number of frames of the zero occurrence—in the preferred embodiment of the present invention the predetermined number of frames is twenty (20), a flag is set to 1, otherwise the flag is reset to 0. If the flag is 1, a greater weight is given to the possibility that the call was answered by a live person.

In accordance with the present invention, answersize is analyzed because I have discovered it to be a highly effective means for discriminating between an answer by a live person or by an answering machine. I have discovered that a live person will answer with "Hello" which varies in length typically from about 0.1 sec to about 1.0 sec. Rarely will someone answer, for example, "Richman residence," which lasts no more than about 2.5 sec. I have discovered that an answering machine plays a prompt which almost always exceeds this length. However, in accordance with the present invention, in order to calculate the answer length, it is necessary to bridge inter-word gaps which are typically no more than 300 ms. Then, in accordance with the present invention, if the answer length exceeds a predetermined maximum expected for a live person, the call will be deemed to have been answered by an answering machine. Further, in performing such analysis, predetermined values of maximum answer size and maximum interword silence may be changed adaptively depending upon measurements made during the call.

FIG. 1 shows a block diagram of an embodiment of the present invention, answering machine detector 1000. As shown in FIG. 1, telephone signal 1010 is applied as input to click detector 1020, ring detector 1030, voice detector 1040, and energy detector 1050. It is known in the art that audio clicks or impulses are a normal feature of analog signals transmitted over a telephone network. As is known, such clicks arise from a variety of sources such as: (a) opening or closing of a loop current circuit, typically caused by answering or hanging up a telephone, or by dialing pulse digits from a rotary dial telephone and the like and (b) nonspecific noise impulses. Click detector 1020 detects whether a click has occurred in a period of time referred to as a frame and stores an indication thereof in storage means 1060. Ring detector 1030 detects whether a ring event started, continues, or ended in the frame and stores an indication thereof in storage means 1060. Voice detector 1040 detects whether a voice event occurred in the frame and stores an indication thereof in storage means 1060. Energy detector 1050: (a) determines a measure of the total energy of the signal in the frame and a parameter of the signal referred to a broad (which parameter will be explained in detail below); (b) stores them in storage means 1060; and (c) transmits a signal to controller means 1070.

In response to the signal from energy detector 1060, controller means 1070 obtains the voice indication from storage to determine whether a voice event has occurred. If a voice event occurred, controller means 1070 transmits a signal to voice analyzer 1100 to determine whether the telephone call was answered by an answering machine. Then, controller means 1070 obtains ring indication information from storage means 1060 to determine whether the signal is in the middle of a ring or if a ring has started in this frame. If so, controller means 1070 transmits a signal to ring analyzer 1090. Then, if the frame is not inside a ring or voice, controller means 1070 transmits a signal to noise detector 1080 to determine whether the current frame is noise. Then, controller means 1070 obtains click indication information from storage means 1060 to determine whether the frame includes a click. If so, controller means 1070 transmits a signal to click analyzer 1110. If there is no ring-on event in this frame, controller means 1070 transmits a signal to answer analyzer 1120 to determine whether the telephone call has been answered. Then, controller means 1070 transmits a signal to silence analyzer 1130 to determine whether the frame corresponds to silence.

Noise detector 1080, in response to a signal transmitted thereto by controller means 1070, obtains information from storage means 1060 and analyzes the frame to determine whether or not it is noise. In accordance with the preferred embodiment of the present invention, the frame is considered to be noise: (a) if the measure of total energy of the frame is less than a "voice threshold" or (b) if the measure of total energy is greater than another predetermined threshold or broad is greater than a predetermined "broad threshold". If the frame is considered to be noise, noise detector 1080 does the following: (a) adds the measure of total energy to, and stores, a sum of noise energy; (b) determines whether the measure of total energy is below a "hiss level" and, if so, increments and stores a count of the number of frames in the current block of noise below the "hiss level"; and (c) increments and stores a count of frames of noise in the current block of noise. Whenever, the count of frames of noise equals a predetermined amount, noise detector 1080 updates a structure in storage means comprised of the sum of noise energy in the block and the number of frames below the "hiss level" in the block.

Ring analyzer 1090, in response to a signal transmitted thereto by controller means 1070, obtains information from storage means 1060. If a ring-on event occurred in this frame, ring analyzer 1090 stores the frame number of this frame (ring-on time), clears the frame number of the first audio frame since only audio occurring after the telephone call has been answered is of interest, erases noise array information since only noise occurring after the last ring is of interest, increments a frame count for the ring, determines whether there was a ring-off event in the same frame, and if so, performs the activities set forth below for a ring-off event. If a ring-off event occurred in this frame, ring analyzer 1090 stores the frame number of this frame (ring-off time), determines the length of the ring (ring-on time—ring-off time), stores these results and clears a variable which indicates the frame number of the most recent click since, in accordance with the present invention, only clicks occurring after the last ring are relevant to the analysis of the present invention.

Voice analyzer 1100, in response to a signal transmitted thereto by controller means 1070, obtains information from storage means 1060 and analyzes the frame to determine whether the telephone call has been answered. If this is the first frame in which voice is detected, then a signal is transmitted to on-first voice analyzer 1101 to determine whether this telephone call was answered by an answering machine. However, if this is not the first frame in which voice is detected, a signal is transmitted to after-first voice analyzer 1103 to determine whether this telephone call was answered by an answering machine.

First, on-first voice analyzer 1101 stores the frame number of this first occurrence of voice. Second, on-first voice analyzer 1101 then determines cvtim (the length of time which elapses from "pickup connect" to the beginning of voice). If the length of the last ring is less than a predetermined amount and the number of frames of the last ring event is greater than another predetermined amount, cvtim is set equal to the number of frames between the first occurrence of voice and the end of the last ring. Otherwise, (a) cvtim is set equal to the number of frames between the first occurrence of voice and the detection of the first significant non-ring audio and (b) a test is made to determine whether cvtim is greater than a predetermined amount and a click was detected after the last ring; (i) if so, cvtim is reset to be equal to the number of frames between the first occurrence of voice and the detection of the click after the last ring and (ii) if not, cvtim is set to 0 indicating that the measurement was unreliable. Third, on-first voice analyzer 1101 analyzes the last group of noise information to determine the group having the lowest total energy. Fourth, on-first voice analyzer 1101 sets and stores: (a) an indicator that a voice event was detected and (b) a counter of frames of voice detection to a predetermined minimum value. Fifth, on-first voice analyzer 1101 determines whether there were a predetermined number of consecutive frames (4 in the preferred embodiment) of silence within a predetermined number of frames (20 in the preferred embodiment) of the first occurrence of voice and, if so, sets and stores an indication thereof. Sixth, on-first voice analyzer 1101 determines whether cvtim is greater than a predetermined maximum. If so, on-first voice analyzer 1101 transmits signal 1150 to reporter 1200 to indicate that the telephone call was answered by an answering machine. Seventh, on-first voice analyzer 1101 examines whether there was a block of silence close to the first voice event. If so, a on-first determination cannot be made. Eighth, on-first voice analyzer 1101 determines whether: (a) the total noise energy of the group of block information is greater than a predetermined amount and (b) the count of frames in the group below hiss level is less than a predetermined number. If so, there is a large amount of noise prior to the onset of voice and on-first voice analyzer 1101 transmits signal 1150 to reporter 1200 to indicate that the telephone call was answered by an answering machine. Ninth, on-first voice analyzer 1101 determines whether: (a) cvtim exceeds a predetermined amount; (b) the total noise energy of the group of block information is greater than a predetermined amount; and (c) the count of frames in the group below hiss level is less than the predetermined number. If so, there is a long time to connect and some hiss and on-first voice analyzer 1101 transmits signal 1150 to reporter 1200 to indicate that the telephone call was answered by an answering machine. Tenth, no report of answering machine detection was made, and on-first voice analyzer 1101 determines whether cvtim is greater than a predetermined amount. If so, on-first voice analyzer 1101 resets and stores the maximum answer size to a predetermined amount.

First, after-first voice analyzer 1103 determines whether there is silence by determining whether the sum of the measure of total energy for a predetermined number of frames falls below a predetermined amount. If so, (a) a counter of non-silence frames after voice detection is set to 0 and stored and (b) a counter of frames with silence after voice detection is incremented and stored. If not, (a) the non-silence counter is incremented and stored and (b) if the count of non-silence reaches a predetermined amount, the silence counter is set to 0 and stored. Second, after-first voice analyzer 1103 increments and stores the counter of frames of voice detection. Third, after-first voice analyzer 1103 determines the length of the voice answer to the telephone call as the difference between the length of frame count of voice and the number of frames of silence. This subtraction of silence removes times when a person is not speaking from the length determination. Fourth, after-first voice analyzer 1103 determines whether the length of the voice answer exceeds an adaptive maximum answer size. If so, after-first voice analyzer 1103 transmits signal 1160 to reporter 1200 to indicate that the telephone call was answered by an answering machine. If not, after-first voice analyzer 1103 determines whether the length of the silence exceeds a predetermined maximum and, if so, there is a long silence after detecting voice and after-first voice analyzer 1103 transmits signal 1160 to reporter 1200 to indicate that the telephone call was answered by a live person.

Click analyzer 1110 stores the frame number of this most recent click in storage means 1060.

Answer analyzer 1120 obtains information from storage means 1060 to determine whether the telephone call has been answered. In accordance with the present invention, this occurs if the total energy is above a predetermined threshold, the frame is past a ring-off event by a predetermined number of frames, and this is the first frame satisfying these conditions. If so, answer analyzer 1120 saves the frame number of the frame in which the telephone call was answered.

Silence analyzer 1130 obtains information from storage means 1060 for analysis of silence. Silence analyzer 1130 examines the measure of total energy for this frame to determine whether the frame corresponds to silence (the measure of total energy is substantially equal to 0 in the preferred embodiment). If there is silence, silence analyzer 1130 does the following: (a) increments and stores a count of silent frames and, if the count is greater than or equal to a predetermined amount (4 in the preferred embodiment), stores this frame number of the last frame of a consecutive number of frames of silence. If there is no silence, the count of silent frames is reset to 0 and stored.

Figure 2:
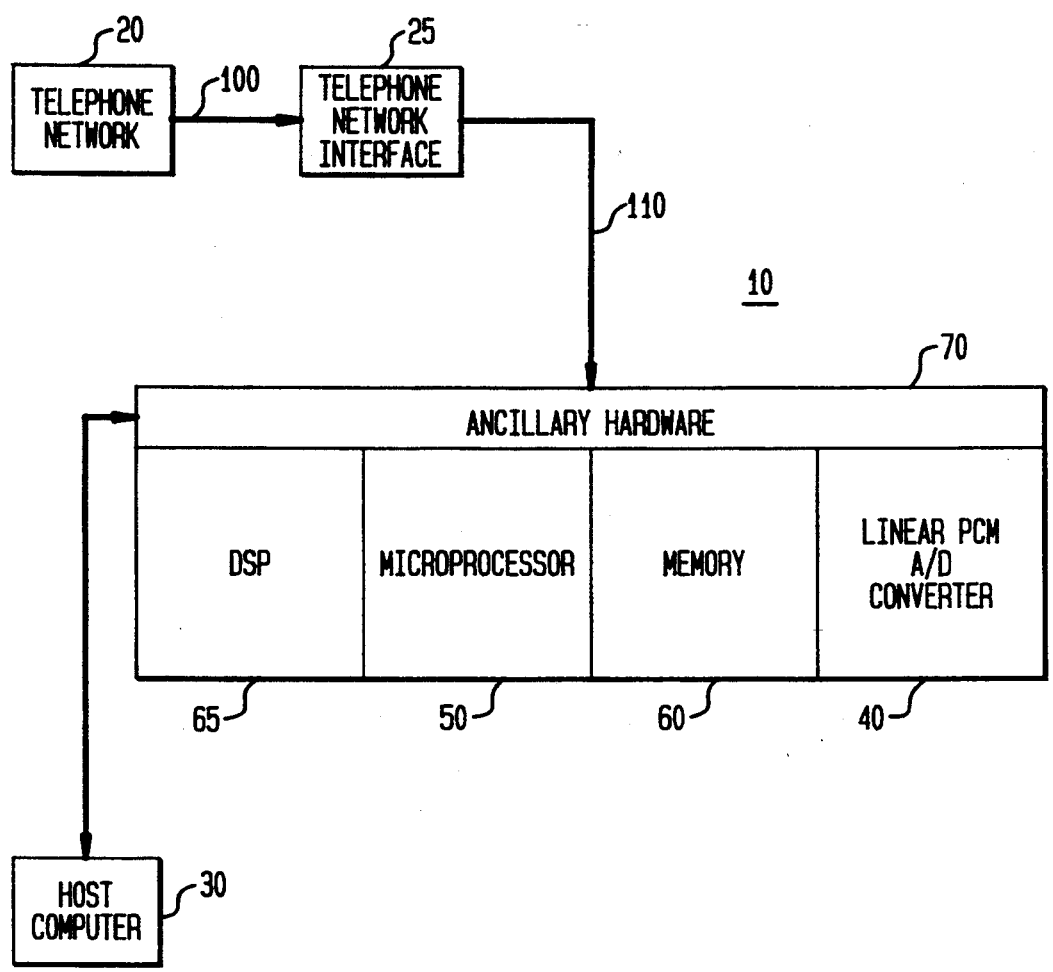
FIG. 2 shows a block diagram of a preferred embodiment of an embodiment of the present invention for detecting the connection of a telephone call to a machine and, in particular, to an answering machine.

FIG. 2 shows a block diagram of a preferred embodiment of the present invention. Specifically, FIG. 2 shows answering machine detector 10 (AMD 10) and the manner in which it is used for detecting whether a telephone call set up, for example, by an automated telephony system has been answered by a machine and, in particular, by an answering machine. As shown in FIG. 2, analog telephone signal 100 from telephone network 20 is transmitted by telephone network interface 25 to AMD 10 as signal 110. Many apparatus for use as telephone interface 25 are well known to those of ordinary skill in the art. For example, one such apparatus comprises a portion of a DIALOG/41D Digitized Voice and Telephony Computer Interface circuit which is available from Dialogic Corporation, 300 Littleton Road, Parsippany, N.J. 07054. In pertinent part, this circuit comprises well known means for interfacing with the telephone network to send and receive calls; means, such as transformers, to electrically isolate subsequent circuits; and filter circuits.

Signal 110 which is output from telephone network interface 25 is applied as input to AMD 10 and, in particular, to ancillary hardware 70. Specifically, signal 110 is applied to a sample and hold circuit (not shown) in ancillary hardware 70, embodiments of which sample and hold circuit are well known to those of ordinary skill in the art.

The output from the sample and hold circuit contained in ancillary hardware 70 is applied to linear PCM analog-to-digital converter 40. There are many circuits which are well known to those of ordinary skill in the art that can be used to embody linear PCM analog-to-digital converter 40. The encoded signal output from analog-to-digital converter 40 is placed, sample by sample, into a tri-state buffer (not shown) for subsequent transmittal to a data bus (not shown). A tri-state buffer for performing this function is well known to those of ordinary skill in the art. For example, the tri-state buffer may be a TI 74LS244 tri-state buffer which is available from Texas Instruments of Dallas, Tex., or any other such equipment.

AMD 10 further comprises microprocessor 50, memory 60, digital signal processor (DSP) 65, and, optionally, a portion of ancillary hardware 70 for use in interfacing with a host computer 30. DSP 65 may be any one of a number of digital signal processors which are well known to those of ordinary skill in the art such as, for example, a Motorola 56000 processor and microprocessor 50 may be any one of a number of microprocessors which are well known to those of ordinary skill in the art such as an INTEL 80188 microprocessor which is available from INTEL of Santa Clara, Calif., or any other such equipment. Memory 60 may be any one of a number of memory equipments which are well known to those of ordinary skill in the art such as an HITACHI 6264 RAM memory which is available from HITACHI America Ltd. of San Jose, Calif., or any other such equipment. The portion of ancillary hardware 70 which interfaces with host computer 30 may be readily fabricated by those of ordinary skill in the art by using circuits which are also well known to those of ordinary skill in the art. For example, the portion of ancillary hardware 70 which interfaces with host computer 30 may be comprised of TI 74LS245 data bus transceivers, TI 74LS244 address buffers, and TI PAL 16L8 control logic, all of which is available from Texas Instruments of Dallas, Tex., or any other such equipment. Finally, as shown in FIG. 2, AMD 10 interfaces with host computer 30, which may be any one of a number of computers which are well known to those of ordinary skill in the art such as, for example, an IBM PC/XT/AT, or any other such equipment.

The encoded digital samples output from linear PCM analog-to-digital encoder 40 are placed in the buffer (not shown) and are output, in turn, therefrom to the data bus (not shown). Then, the digital samples are received from the data bus, digital sample by digital sample, by microprocessor 50. Microprocessor 50, in accordance with the present invention and as will be described in detail below, places a predetermined number of digital samples on the data bus for receipt and analysis by DSP 65. The output from DSP 65 is placed on the data bus for transmittance to microprocessor 50. Then, as will be described in detail below, microprocessor 50, in conjunction with a program and data stored in memory 60, analyzes the DSP output to detect whether a telephone call has been answered by a machine and, in particular, by an answering machine and, in response thereto, to generate and to transmit a signal to host computer 30. As is well known to those of ordinary skill in the art, host computer 30 may be a part of an interactive system which is utilized to place telephone calls to members of the public and to connect a business agent to the member of the public after the call is answered thereby. As such, the interactive system of which host computer 30 is a part utilizes the signal provided by AMD 10 to provide information to the answering machine or it connects the member of the public to a business agent. Such systems are well known in the art and, for simplicity, their detailed operation need not be set forth here.

If input telephone signal 100 is not an analog signal, as is the case for the embodiment shown in FIG. 2, but is instead a digital signal, embodiments of the present invention convert the digital values of the input signal into a linear PCM digital format. For example, if the input digital signal values had been encoded using u-law or A-law PCM, they are converted into a linear PCM format. This conversion is performed in accordance with methods and apparatus which are well known to those of ordinary skill in the art such as, for example, by using a look-up table stored in memory 60. Nevertheless, in describing the inventive method and apparatus, for ease of understanding, I will refer to the linear PCM digital format samples which are output from analog-to-digital encoder 40 as digital samples.

The digital samples are input into DSP 65 where they are grouped for analysis into short time duration segments of the input signal, which short time duration segments are referred to as frames. In particular, a frame is comprised of a predetermined number of samples of an input analog signal or a predetermined number of values of a input digital signal, all in linear PCM format, i.e., a frame comprises digital samples which occur for a time period of 12 ms. For each frame, DSP 65 produces the frequency spectrum of the first 8 ms of the 12 ms segment and the last 4 ms of the previous 12 ms segment of input signal 100 by performing a Discrete Fourier Transform (DFT). In particular, in preferred embodiments of the present invention, the DFT is a Fast Fourier Transform (FFT) which is performed by DSP 65. Next DSP 65 determines a measure of the energy of the frequency bins in the frequency spectrum. Next, DSP 65 determines the total of the measures of energy of the frequency spectrum. Next, DSP 65 provides frequency and a measure of energy for the two largest peaks in the frequency spectrum of the input signal—chosen from 64 bins of 62.5 Hz width.

In the preferred embodiment of the present invention shown in FIG. 2 for use in analyzing analog signal 100 which is transmitted over the public switched telephone network (PSTN) and which has a 4000 Hz bandwidth, analog signal 100 is sampled, in accordance with the Nyquist criterion, at least 8000 times/sec and the predetermined number of samples or values per frame is chosen to be 128. Further, in the preferred embodiment, in order to increase temporal resolution, a frame of 128 values which is input to DSP 65 for Fourier analysis is comprised as follows. The "present" frame comprises the last 32 values from the previous frame and the next or "new" 96 values which have been obtained from input signal 100. As a result, the "next" frame to be Fourier analyzed by the FFT after the "present" frame comprises the 32 "old" values from the "present" frame and the next 96 values obtained from input signal 100. Then, prior to calculating the FFT, each sample or value $S_n$ (where $n=0, \ldots, 127$) is multiplied by a windowing function, the values of which windowing function have been previously stored in memory. Various windowing functions which are suitable for such use are well known to those of ordinary skill in the art and are advantageous in that their use reduces anomalous spectral components due to the finite frame length of 128 samples.

As a result of the above, when DSP 65 of FIG. 2 is embodied in a Motorola 56000 DSP and 128 samples are used to perform a Fast Fourier Transform (FFT), a 128 bin frequency spectrum for the input signal is produced wherein the frequency bins are 62.5 Hz wide. Each frequency bin in the frequency spectrum has a bin index denoted by n. However, because the signal is real, only the first 64 bins are of interest since the last 64 bins are identical to the first 64 bins. The real and imaginary coefficients determined by the FFT for each frequency bin are squared and summed to provide a bin energy $e(n)$ for each frequency bin in the frequency spectrum and, in addition, the energies for each bin are summed to provide the total energy ETOT for the frame. Next, a predetermined number of energy maxima in the frequency spectrum of the frame are determined. An energy maximum is defined as the occurrence of a bin in the frequency spectrum of a frame which has more energy than its adjacent sidebins and, in accordance with a preferred embodiment of the present invention, the only energy maxima determined are the three largest in the spectrum. DSP 65 determines the value of broad for the frame; broad=$(E_1+E_2)/(E_{TOT}-E_1-E_2)$, where $E_n$ is the energy of the nth peak. DSP 65 also detects whether a click has occurred. If a click has been detected, DSP 65 sets flag clickflg=1. Click detection is performed in accordance with an invention described in a patent application entitled CLICK DETECTION, which patent application has the same inventor as this patent application, which patent application has been assigned to the assignee of this patent application, and which patent application is hereby incorporated herein by reference. Then, DSP 65 transmits the total energy of the frame broad, and flag clickflg to microprocessor 50 for analysis.

Microprocessor 50 analyzes the output from DSP 65 to detect whether a telephone call has been answered by a machine and, in particular, by an answering machine.

Before describing a preferred embodiment of the present invention in detail by reference to a software program executed by microprocessor 50, which software performs in accordance with a flow chart shown in FIGS. 3A–3I, I will describe the software program of microprocessor 50 in general to enable those of ordinary skill in the art to more easily understand the present invention, In accordance with the present invention, microprocessor 50 initializes the following flags and variables at the beginning of a call:
flags:

| | |
|---|---|
| vflg = 0 | is set to 1 if voice has already been detected |
| pvdon = 0 | is set to 1 if a positive voice detection (pvd) event occurred this frame |
| roffflg = 0 | is set to 1 if a ring-off event occurred during this frame |
| ronflg = 0 | is set to 1 if a ring-on event occurred during this frame |
| clickflg = 0 | is set to 1 if a click event occurred during this frame | variables:
etot[0]=0; etot[1]=0; clkcnt=0; sil=0; noiserg=0; noisbrk=0; noiscnt=0; nptr=0; blohiss=0; nscnt=0; firstfnm=0; siz=0; zerofnm=0; zerocnt=0; noisarry[i].bh=8; noisarry[i].erg=0; roff=0 (frame number of the last ring end received); and ron=0 (frame number of the last ring start received).

The main module for the program, MAIN, is comprised of a loop wherein each iteration of the loop receives input, on a per frame basis, from DSP 65 and from a general tone detector application also running on microprocessor 50, at the beginning of a telephone call the frame number is 0. The input from DSP 65 comprises the total energy of the frame, broad, and a flag clickflg which indicates whether a click is present. The input from microprocessor 50 comprises flags ronflg and roffflg indicating whether ring-on or ring-off events have occurred during the current frame. As was described above, flag clickflg is provided in accordance with an invention described in the patent application entitled CLICK DETECTION described above and flags ronflg and rofflg are provided in accordance with an invention described in a patent application entitled TONE DETECTION, Ser. No. 07/754,537, filed Sep. 4, 1991, which patent application has the same inventor as this patent application, which patent application has been assigned to the same assignee as this patent application, and which patent application is hereby incorporated herein by reference.

The following will go through the analysis performed by an embodiment of the present invention from the beginning of a telephone call until a determination is made as to whether the telephone call was answered by an answering machine or by a live person. Assume that the first frame of a telephone call has zero total energy; as a result, 0 is stored in array etot[]. Further assume that no voice has been detected, i.e., flag pvdon is not set, and that the frame is not in the midst of a ring. As a result, a determination is made as to whether or not the current frame is noise. If it is noise, information concerning the most recent noise is updated by a module noisupd(). However, if the current frame is not noise and there has been no noise frame for the last four frames, all memory of the current block of noise is reset. In accordance with the present invention, the first frame of a telephone call is considered to be noise even though there is no energy. Since etot[0]=0, zerocnt is incremented and, since zerocnt does not yet equal 4, nothing else is done for this frame except to push the value of etot[0] into etot[1].

Assume that the next frame of the telephone call also has zero total energy and, as a result, the same steps are carried out as were described above for the first frame, i.e., zerocnt is incremented and etot[0] is pushed to etot[1].

Assume that the next two frames of the telephone call also have zero total energy. However, in the fourth frame, zerocnt is equal to 4 and, as a result, the current frame number, i.e., 4, is stored in variable zerofnm.

Assume that the fifth frame of the telephone call has zero total energy. However, zerocnt is now equal to 5 and, as a result, the current frame number, i.e., 5, is stored in variable zerofnm.

Assume that the above goes on for several hundred frames until the first ring is detected and ronflg is set to one. As one can see from this, the variable zerofnm always contains the frame number of the last occurrence of at least four consecutive zero energy frames.

Assume that the next frame of the telephone call looks nothing like noise and a module noischar() which is used to determine whether a frame corresponds to noise or not will return zero. In addition, clickflg is not set because this frame is not a click. Since ronflg is set to one, a module ringstrt() is called to: (a) wipe out the noise block arrays; (b) set variable ron to the current frame number, and (c) increment variable ringcnt which counts the number of frames during which the present ring has existed. As always, etot[0] is pushed to etot[1].

Assume that the next frame of the telephone call has roff<ron and we are inside a ring. In accordance with the present invention, in such frames the analysis is only interested in detecting a ring-off event. Eventually the ring ends and flag roffflg is set to one. When this occurs, variable roff is set to the current frame number and the length of the ring is stored in variable rlen.

As one can readily appreciate from the above, the main processing routine goes on, frame by frame, analyzing: (a) noise; (b) ring-on and ring-off events; and (c) click events. Finally, the last ring ends and more silent frames are obtained until a frame is encountered wherein etot[0]>6. This provides evidence that this telephone call has been answered and the frame number of this occurrence is stored in variable firstfnm. The routine proceeds to analyze noise until a voice detection event occurs, which occurrence is signaled by the setting of flag pvdflg to one. Flag pvdflg is provided in accordance with an invention described in a patent application entitled VOICE DETECTION, which application has the same inventor as this patent application, which patent application has been assigned to the same assignee as this patent application, and which patent application is hereby incorporated herein by reference. At this point, in accordance with the present invention, a quick determination is made as to whether this telephone call was answered by an answering machine. The quick determination is made by module firstvoic() in a manner which will be described in detail below. If module firstvoic() determines that the telephone call was answered by an answering machine, that fact is reported to host computer 30. Assume however, that such a quick determination could not be made for this example. Then, module firstvoic() sets flag vflg to one indicating that voice has already been detected. Subsequent frames are analyzed by module nextvoic(). Module nextvoic() will determine whether the telephone call was answered by a live person or by an answering machine in a manner which will be described in detail below based on the length of the answer.

The following describes the method of operation of several of the modules in general before they are described in detail below.

Module noischar() is called for each frame that ring or voice is not present and, in accordance with the present invention, it characterizes the frame as being comprised of noise or not. In accordance with the present invention, anything that is not a possible voice or tone signal is considered to be noise. In particular, if etot[0]<voicthresh then the frame energy is considered to be too low to be voice or tone. If, however, etot[0] is greater than voicthresh but a measurement of broad is greater than a predetermined maximum, nmaxbrod, then it is considered not to be noise. In addition, if etot[0] is greater than a predetermined maximum, nmaxerg, then it is considered not to be noise. Otherwise, the frame is considered to be noise. Module noischar() returns a 1 if the frame is considered to be noise and a 0 if it is not. If module noischar() returns 0, then a counter, noisbrk; is incremented in the module main and, if noisbrk exceeds 4, then all counters for the current noise block are reset to 0.

If module noischar() returns a 1, then module noisupd() is called. Module noisupd() increments noiscnt and adds etot[0] to the accumulated noise energy of the present frame, noiserg. Noiscnt counts the number of frames in the current block of noise. If etot[0] is below a predetermined minimum, then blohiss is incremented, blohiss being a variable which contains the number of frames in the current noise block below hiss level.

If noiscnt equals blocksize windlen, then values in array noisarry are updated. Noisarry is a circular buffer which contains the most recent noislen blocks. In particular, noisarry is an array of structures wherein each structure contains the sum of the total of energy in the block, noisarry[].erg, and the number of frames below hiss level in the block, noisarry[].blohiss. After these values are updated for the current block, all counters and flags are reset along with counter noisbrk which counts the number of frames in the current block which are not noise. Finally, if the index into the array, nptr, is at the end of the buffer, it too is reset.

Module ringstrt() records the frame number of a ring-on event, sets ringcnt=1, where ringcnt counts the number of frames encountered thusfar in the current ring, and resets firstfnm and noisarry[]. Note that it is possible to receive a ring-on and a ring-off event in the same frame. For example, this may be the case for very short rings. In such a case, roffflg will be equal to 1 in addition to ronflg being equal to 1. If this occurs, the ring-off frame number will be saved in roff and the ring length will be determined and stored in rlen. Lastly, variable click containing the frame number of the most recent click will be cleared since, in accordance with the present invention, only clicks occurring after the last ring are relevant to the analysis of the present invention.

Module firstvoic() is called the first time that voice is encountered. Variable von is set equal to the current frame number and module cvcalc() is called to calculate variable cvtim. Then, module nois() is called to calculate values nois.erg and nois.bh. Next, variable vflg is set equal to 1 and answer size counter vcnt is set equal to predetermined constant PVDWIN. If there has been an occurrence of at least 4 consecutive zero energy frames in the last 20 frames, then zeroflg is set equal to 1, otherwise it is set equal to 0.

Module firstvoic() determines whether cvtim is greater than a predetermined threshold cvthr2. If so, maxansiz is changed to maxans2. In accordance with the present invention, if cvtim is large, then the telephone call is more likely to be an answering machine and setting maxansiz equal to maxans2 will improve the accuracy of the detector.

Module cvcalc() calculates cvtim when a voice is first detected. I have discovered that the best indication that a telephone call has been answered is that a short ring is encountered. Thus, in accordance with the present invention, module cvcalc() determines whether rlen is less than a predetermined minimum number of frames minting and that the last ring is not the first ring is encountered in the telephone call. If so, the analysis is sure that the telephone call was answered at frame roff and, in this case, cvtim is set equal to von−roff. However, if the last ring is of normal length, then module cvcalc() takes the frame where the telephone line was answered to be firstfnm, i.e., the frame wherein the first significant audio was encountered after the last ring. In this case, cvtim is set equal to von−firstfnm. In accordance with the present invention, it is recognized that this latter step may not be quite accurate enough where, for example, cvtim is greater than 500 and a click has occurred since the last ring. Then, in this case, cvtim is set equal to von−click.

Module nois() selects the block which has the lowest energy as the "best" block and the total energy and number of frames below hiss for this "best" block are stored in the structure elements nois.erg and nois.bh.

Module qdecide() makes a decision as to whether a telephone call was answered by an answering machine or whether the analysis is not sure at this point. At first, it determines whether cvtim is greater than maxvcvth. If so, in accordance with the present invention, it is very likely that the telephone call was not answered by a live person and the module decides that an answering machine answered and returns a 1. However, if zeroflg is set to 1, in accordance with the present invention, the telephone call may have been answered by a live person—the analysis is not sure yet, but there was a long period of silence just prior to voice. In this case module qdecide() returns a 0.

If zeroflg is 0, module qdecide performs two additional tests. First, if nois.erg is large and nearly all of the frames in the noise block are above a high hiss energy threshold, then module qdecide() determines that the telephone call was answered by an answering machine and returns a 1. Second, if cvtim is large and nois.erg is large and nearly all of the frames are above a low hiss energy threshold, then module qdecide() determines that the telephone call was answered by an answering machine and returns a 1. Otherwise, a decision cannot be made since the analysis is not sure and module qdecide() returns a 0.

Module nextvoic() determines whether etot[0-]+etot[1] is lower than silence threshold sthresh. If so, silence counter sil is incremented and non-silence counter nscnt is reset to zero. If, however, etot[0-]+etot[1] is greater than silence threshold sthresh, then nscnt is incremented. If nscnt ever exceeds 3, then sil is reset to 0 since it no longer considered to be in a condition of silence.

Next, voice length counter vcnt is incremented. A determination is made as to whether vcnt−sil, the true length of the voice, is greater than maxansiz. If so, module nextvoic() decides that the telephone call was answered by an answering machine and reports this to host computer 30. If, however, sil ever reaches maxsil, in accordance with the present invention, module nextvoic() determines that too much silence has occurred after voice and that a live person has answered the telephone call. Similarly, this is reported to host computer 30.

With the general description set forth above in mind, the following now describes the preferred embodiment of the present invention in connection with FIGS. 3A–3I.

When AMD 10 is activated for the first time, certain constants are given defined values which are not changed during the operation of microprocessor 50. In particular, minring=158; maxsil=30; voicthresh=25; hihiss=16; lohiss=22; bhparm=5; maxans2=50; maxvcvth=390; cvthr1=80; cvthr2=165; windlen=8; nmaxbrod=2; nmaxerg=65; sthresh=30; PVDWIN=8; and NOISLEN=3.

At the beginning of each call, certain flags and variables are initialized. In the preferred embodiment of the present invention, this later initialization occurs by invoking an initialization routine. In this initialization routine the following are set: vflg=0; pvdon=0; roffflg=0; ronflg=0; clickflg=0; etot[0]=0; etot[1]=0; clkcnt=0; sil=0; noiserg=0; noisbrk=0; noiscnt=0; nptr=0; blohiss=0; nscnt=0; firstfnm=0; siz=0; zerofnm=0; zerocnt=0; noisarry[i].bh=8; noisarry[i].erg=0; roff=0; ron=0 and maxansiz=125. Then as each frame of information is received by microprocessor 50 in time sequence, the frame information is transferred to the main processing routine whose flow chart is shown in FIG. 3A.

At box 100 of FIG. 3A, the program receives the frame information including total energy, and event indicators for voice, click, and ring. Then, the program stores the frame energy in array etot[] as etot[0]. Then, control is transferred to box 110 of FIG. 3A.

At box 110 of FIG. 3A, the program determines whether voice has been detected in a previous frame, i.e., whether vflg=1. If so, control is transferred to box 120 of FIG. 3A, otherwise, control is transferred to box 130 of FIG. 3A.

At box 120 of FIG. 3A, the program calls module nextvoic(). Then, control is transferred to box 340 of FIG. 3A.

At box 130 of FIG. 3A, the program determines whether a voice has been detected for the first time in this frame, i.e., the program determines whether pvdon=1 and vflg=0. If so, control is transferred to box 140 of FIG. 3A, otherwise, control is transferred to box 150 of FIG. 3A.

At box 140 of FIG. 3A, the program calls module firstvoic(). Then, control is transferred to box 340 of FIG. 3A.

At box 150, the program determines whether the frame is inside a ring, i.e., the program determines whether roff is less than ron. If so, control is transferred to box 160 of FIG. 3A, otherwise, control is transferred to box 180 of FIG. 3A.

At box 160 of FIG. 3A, the program determines whether the ring ended, i.e., the program determines whether roffflg=1. If so, control is transferred to box 170 of FIG. 3A, otherwise, control is transferred to box 340 of FIG. 3A.

At box 170 of FIG. 3A, save the ring-off time, clear the click flag, and calculate the ring length, i.e., the program sets roff=fnm, click=0, and rlen=roff−ron+4 (the addition of 4 frames occurs because it typically takes 4 frames to detect a ring-on). Then, control is transferred to box 340 of FIG. 3A.

At box 180 of FIG. 3A, the frame is not inside a ring or voice and the program calls module noischar() to determine whether the frame is noise. Then, control is transferred to box 190 of FIG. 3A.

At box 190 of FIG. 3A, the program determines whether the return from module noischar()=1. If so, control is transferred to box 200 of FIG. 3A, otherwise, control is transferred to box 210 of FIG. 3A.

At box 200 of FIG. 3A, the program calls module noisupd() to update noise parameters. Then, control is transferred to box 230 of FIG. 3A.

At box 210 of FIG. 3A, the program increments absence of noise counter noisbrk, i.e., the program sets noisbrk=noisbrk+1. Then, control is transferred to box 215 of FIG. 3A.

At box 215 of FIG. 3A, the program determines whether there has been no noise for the last 4 frames. If so, control is transferred to box 220 of FIG. 3A, otherwise, control is transferred to box 230 of FIG. 3A.

At box 220 of FIG. 3A, the programs sets various window parameters to 0, i.e., the program sets noiserg=0, noiscnt=0, noisbrk=0, and blohiss=0. Then, control is transferred to box 230 of FIG. 3A.

At box 230 of FIG. 3A, the program determines whether the frame includes a click event, i.e., the program determines whether clickflg=1. If so, control is transferred to box 240 of FIG. 3A, otherwise, control is transferred to box 250 of FIG. 3A.

At box 240 of FIG. 3A, the program saves the frame number of the most recent click. Then, control is transferred to box 250 of FIG. 3A.

At box 250 of FIG. 3A, the program determines whether a ring has started in this frame, i.e., the program determines whether ronflg=1. If so, control is transferred to box 260 of FIG. 3A, otherwise, control is transferred to box 270 of FIG. 3A.

At box 260 of FIG. 3A, the programs calls module ringstrt(). Then, control is transferred to box 340 of FIG. 3A.

At box 270 of FIG. 3A, the program determines whether etot[0] is greater than 6 and firstfnm=0 and (fnm−roff) is greater than 2. If so, control is transferred to box 280 of FIG. 3A, otherwise, control is transferred to box 290 of FIG. 3A.

At box 280 of FIG. 3A, the programs sets firstfnm=fnm. Then, control is transferred to box 290 of FIG. 3A.

At box 290 of FIG. 3A, the program determines whether etot[0]=0. If so, control is transferred to box 300 of FIG. 3A, otherwise, control is transferred to box 330 of FIG. 3A.

At box 300 of FIG. 3A, the program increments zerocnt, i.e., the program sets zerocnt=zerocnt+1. Then, control is transferred to box 310 of FIG. 3A.

At box 310 of FIG. 3A, the program determines whether zerocnt is greater than or equal to 4. If so, control is transferred to box 320 of FIG. 3A, otherwise, control is transferred to box 340 of FIG. 3A.

At box 320 of FIG. 3A, the program stores the frame number of the last frame of 4 frames of zero energy., i.e., the program sets zerofnm=fnm. Then, control is transferred to box 340 of FIG. 3A.

At box 330 of FIG. 3A, the program resets zerocnt=0 if a frame has energy. Then, control is transferred to box 340 of FIG. 3A.

At box 340 of FIG. 3A, the program pushes the energy of the present frame onto the stack, i.e., the program sets etot[1]=etot[0]. Then, control is transferred to box 100 of FIG. 3A.

Figure 3C:
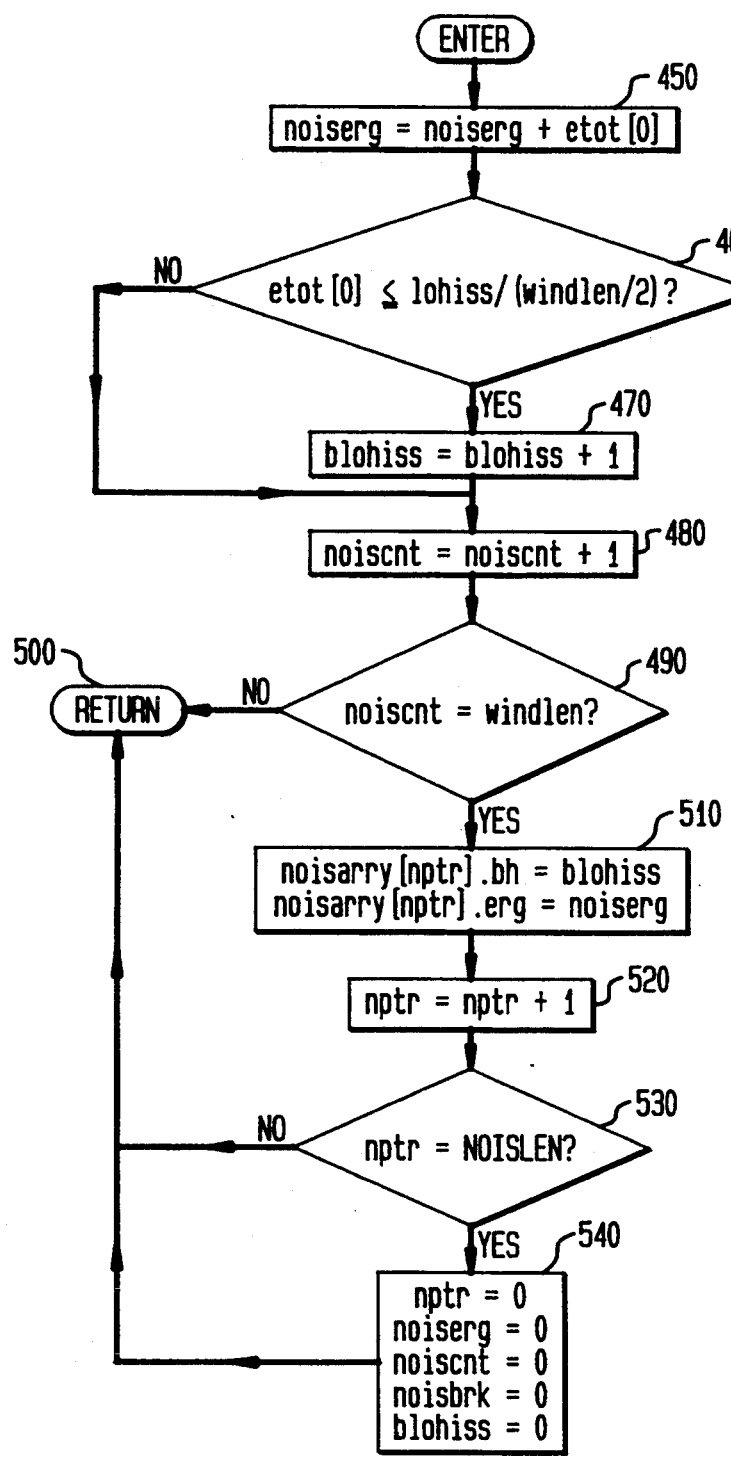
Figure 3B:
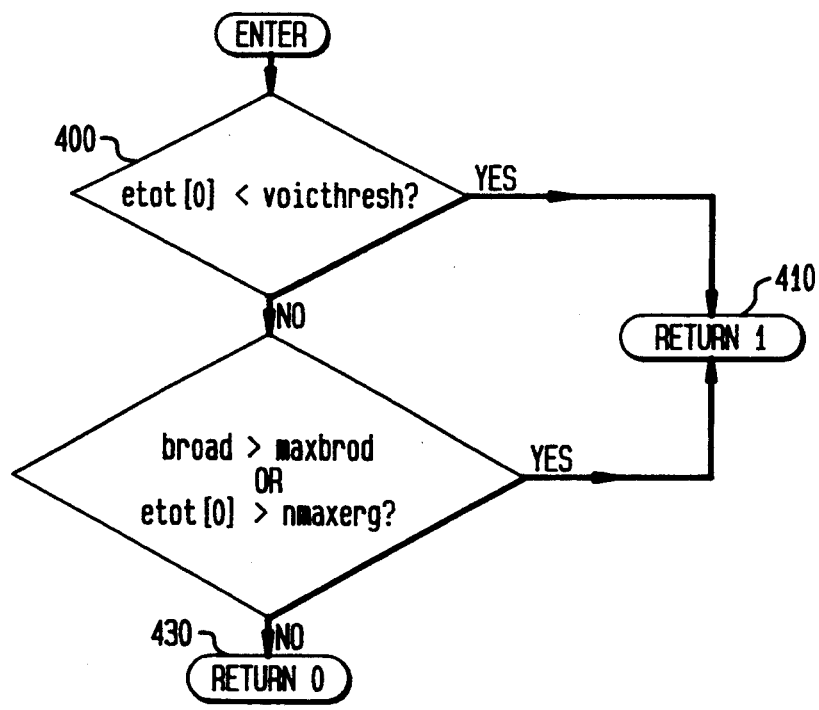

FIG. 3B shows a flowchart for module noischar(). This module determines whether the frame is noise or not. Upon entry to this module, control is transferred to box 400 of FIG. 3B. The program determines whether the energy is less than a voice threshold, i.e., the program determines whether etot[0]<voicthresh. If so, control is transferred to box 410 of FIG. 3B, otherwise, control is transferred to box 420 of FIG. 3B.

At box 410 of FIG. 3B, the programs returns 1 to indicate the presence of noise.

At box 420 of FIG. 3B, the program determines whether broad>nmaxbrod or etot[0]>nmaxerg. If so, the frame is characterized as noise and control is transferred to box 410 of FIG. 3B, otherwise, control is transferred to box 430 of FIG. 3B.

At box 430 of FIG. 3B, the programs returns 0 to indicate the absence of noise.

FIG. 3C shows a flowchart for module noisupd(). This module updates parameters which pertain to noise. Upon entry to this module, control is transferred to box 450 of FIG. 3C. At box 450 of FIG. 3C, the program sets noiserg=noiserg+etot[0]. Then, control is transferred to box 460 of FIG. 3C.

At box 460 of FIG. 3C, the program determines whether etot[0] is below a hiss level, i.e., the program determines whether etot[0]≦lohiss/(windlen/2). If so, control is transferred to box 470 of FIG. 3C, otherwise, control is transferred to box 480 of FIG. 3C.

At box 470 of FIG. 3C, the program increments the number of frames below the hiss level in the current noise block, i.e., the program sets blohiss=blohiss+1. Then, control is transferred to box 480 of FIG. 3C.

At box 480 of FIG. 3C, the program increments the number of frames of noise in the current block of noise, i.e., the program sets noiscnt=noiscnt+1. Then, control is transferred to box 490 of FIG. 3C.

At box 490 of FIG. 3C, the program determines whether the number of frames of noise equals a window length, i.e., the program determines whether noiscnt=windlen. If so, control is transferred to box 510 of FIG. 3C, otherwise, control is transferred to box 500 of FIG. 3C to return.

At box 510 of FIG. 3C, the program updates a circular noise array buffer, i.e., the program sets noisarry[nptr].bh=blohiss and noisarry[nptr].erg=noiserg. Then, control is transferred to box 520 of FIG. 3C.

At box 520 of FIG. 3C, the program increments the array pointer, i.e., the program sets nptr=nptr+1. Then, control is transferred to box 530 of FIG. 3C.

At box 530 of FIG. 3C, the program determines whether nptr=NOISLEN. If so, control is transferred to box 500 of FIG. 3C, otherwise, control is transferred to box 540 of FIG. 3C.

At box 540 of FIG. 3C, the program sets: nptr=0, noiserg=0, noiscnt=0, noisbrk=0, and blohiss=0. Then, control is transferred to box 500 of FIG. 3C.

Figure 3D:
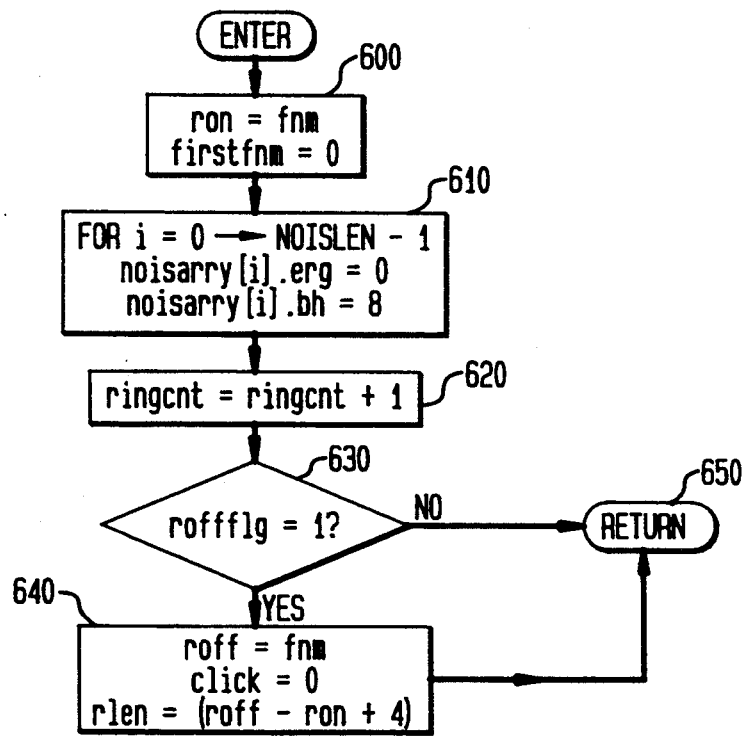

FIG. 3D shows a flowchart for module ringstrt(). This module handles a ring-on event. Upon entry to this module, control is transferred to box 600 of FIG. 3D.

At box 600 of FIG. 3D, the program sets the frame number of the ring-on event and clears the frame number of the first audio frame, i.e., the program sets ron=fnm and firstfnm=0. Then, control is transferred to box 610 of FIG. 3D.

At box 610 of FIG. 3D, the program erases the noise array information, i.e., the program sets noisarry[i]=0 and noisarry[i].bh=8 for i=0 to i=NOISLEN−1. Then, control is transferred to box 620 of FIG. 3D.

At box 620 of FIG. 3D, the program increments the frame count for the ring, i.e., the program sets ringcnt=ringcnt+1. Then, control is transferred to box 630 of FIG. 3D.

At box 630 of FIG. 3D, the program determines whether there was a ring-off event during the same frame, i.e., the program determines whether roffflg=1. If so, control is transferred to box 630 of FIG. 3D.

At box 630 of FIG. 3D, the program determines whether there was a ring-off event during the same frame, i.e., the program determines whether roffflg=1. If so, control is transferred to box 640, otherwise, control is transferred to box 650 of FIG. 3D for return.

At box 640 of FIG. 3D, the program saves the frame of the ring-off and determines the ring length, i.e., the program sets roff=fnm, click=0, and rlen=roff−ron+4. Then, control is transferred to box 650 of FIG. 3D.

Figure 3E:
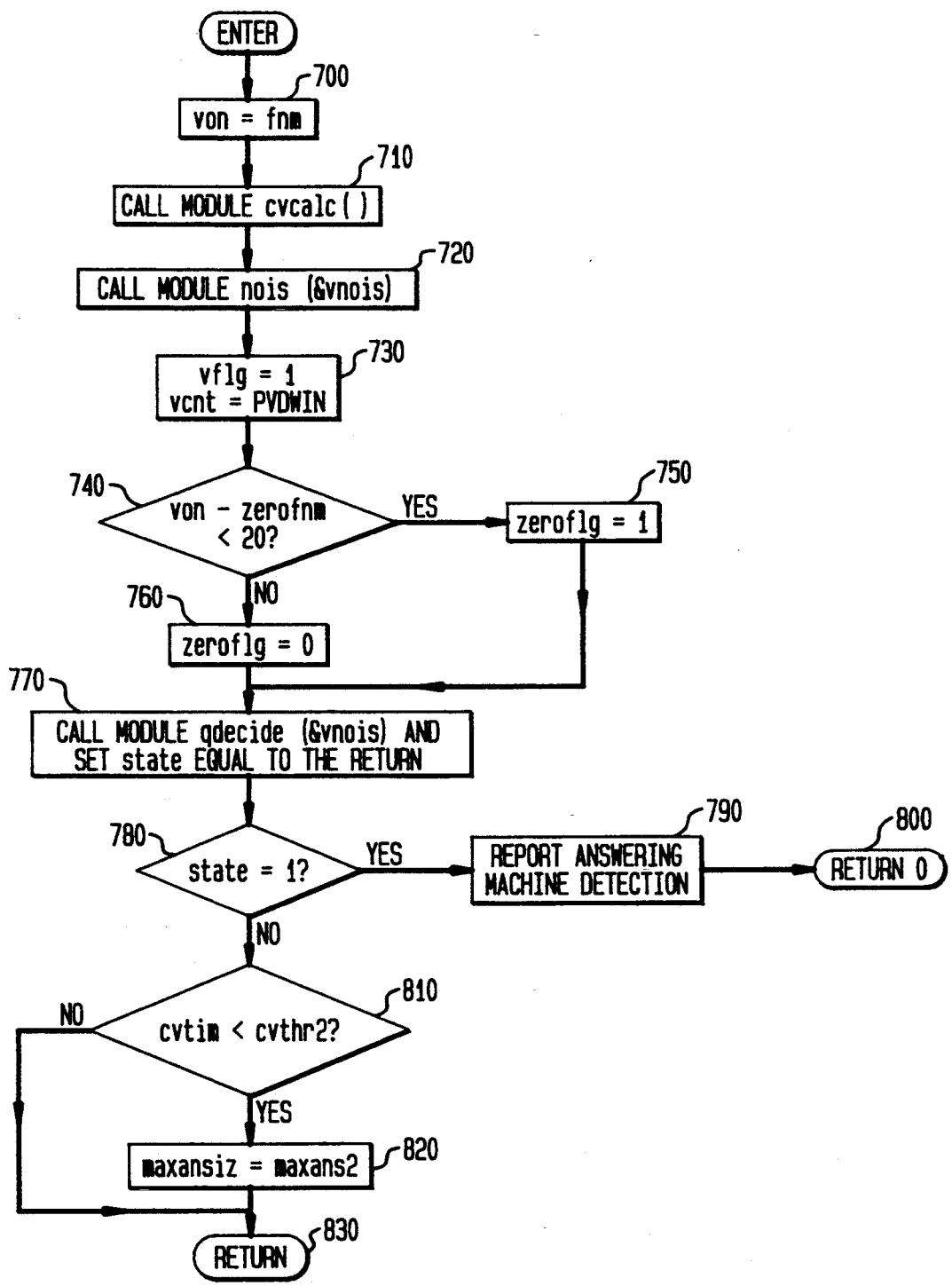

FIG. 3E shows a flowchart for module firstvoic(). This module handles the first occurrence of voice. Upon entry to this module, control is transferred to box 700 of FIG. 3E. At box 700 of FIG. 3E, the program sets the frame number of the first voice event. Then, control is transferred to box 710 of FIG. 3E.

At box 710 of FIG. 3E, the program calls module cvcalc() to determine the time to connect to voice. Then, control is transferred to box 720 of FIG. 3E.

At box 720 of FIG. 3E, the program calls module nois(nptr) to determine the noise in the last NOISLEN windows, where nptr is a pointer to the noise array. Then, control is transferred to box 730 of FIG. 3E.

At box 730 of FIG. 3E, the program sets the voice flag and sets the answer size counter for voice to a predetermined minimum, i.e., the program sets vflg=1 and vcnt=PVDWIN. Then, control is transferred to box 740 of FIG. 3E.

At box 740 of FIG. 3E, the program determines whether there were 4 consecutive frames of silence within 20 frames of the beginning of voice, i.e., the program determines whether (von−zerofnm)<20. If so, control is transferred to box 750 of FIG. 3E, otherwise, control is transferred to box 760 of FIG. 3E.

At box 750 of FIG. 3E, the program sets zeroflg=1. Then, control is transferred to box 770 of FIG. 3E.

At box 760 of FIG. 3E, the program sets zeroflg=0. Then, control is transferred to box 770 of FIG. 3E.

At box 770 of FIG. 3E, the program calls module qdecide(nptr) to make a quick decision as to whether the beginning of voice corresponds to an answering machine. Then, control is transferred to box 780 of FIG. 3E.

At box 780 of FIG. 3E, the program determines whether state=1, where state is the return from module qdecide(). If so, control is transferred to box 790 of FIG. 3E, otherwise, control is transferred to box 810 of FIG. 3E.

At box 790 of FIG. 3E, a report is made to host computer 30 that an answering machine has been detected. Then, control is transferred to box 800 of FIG. 3E for return with parameter 0.

At box 810 of FIG. 3E, the program determines whether cvtim is less than cvthr2. If so, control is transferred to box 820 of FIG. 3E, otherwise, control is transferred to box 830 of FIG. 3E.

At box 820 of FIG. 3E, the program sets maxansiz=-maxans2. Then, control is transferred to box 830 of FIG. 3E.

At box 830 of FIG. 3E, the program returns.

Figure 3F:
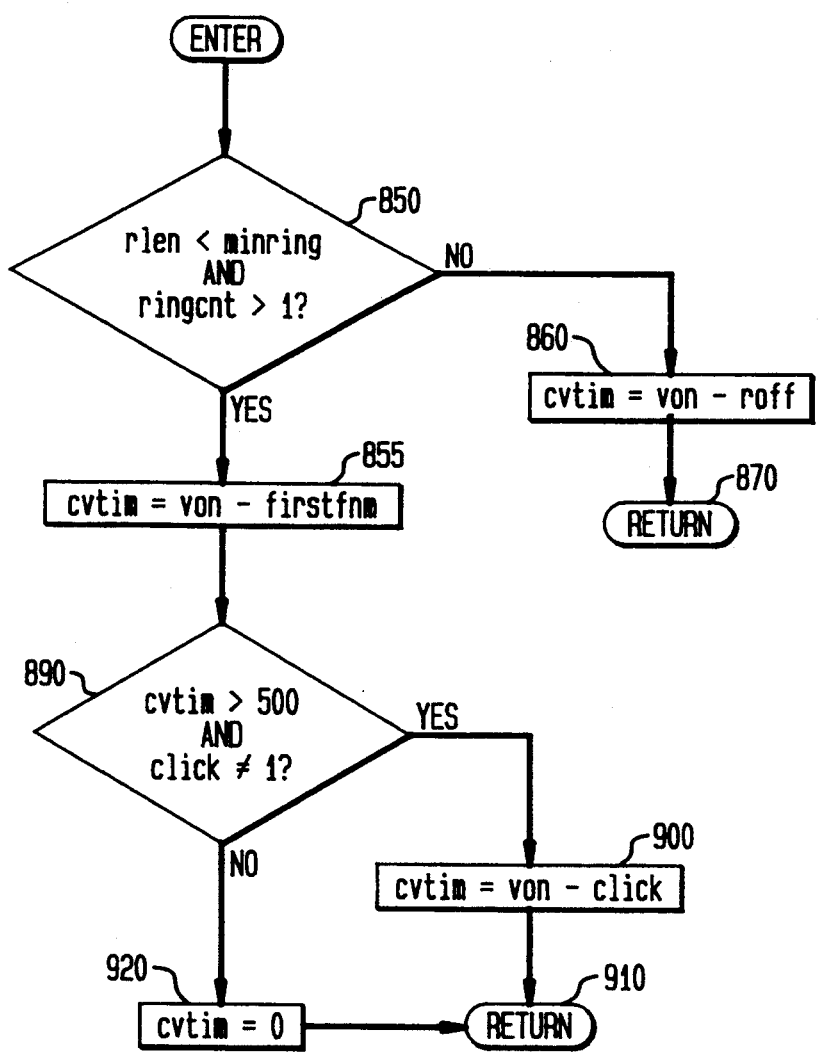

FIG. 3F shows a flowchart for module cvcalc(). This module determines the connect time to voice. Upon entry to this module, control is transferred to box 850 of FIG. 3F. At box 850 of FIG. 3F, the program determines whether rlen<minring and ringcnt>1. If so, control is transferred to box 860 of FIG. 3F, otherwise, control is transferred to box 855 of FIG. 3F.

At box 855 of FIG. 3F, the program sets cvtim=-von−firstfnm. Then, control is transferred to box 890 of FIG. 3F.

At box 860 of FIG. 3F, the program sets cvtim=-von−roff. Then, control is transferred to box 870 for return.

At box 890 of FIG. 3F, the program determines whether cvtim>500 and click is not equal to 0. If so, control is transferred to box 900 of FIG. 3F, otherwise, control is transferred to box 920 of FIG. 3F.

At box 900 of FIG. 3F, the program sets cvtim=-von−click. Then, control is transferred to box 910 of FIG. 3F for return.

At box 920 of FIG. 3F, the program sets cvtim=0. Then, control is transferred to box 910 of FIG. 3F for return.

Figure 3G:
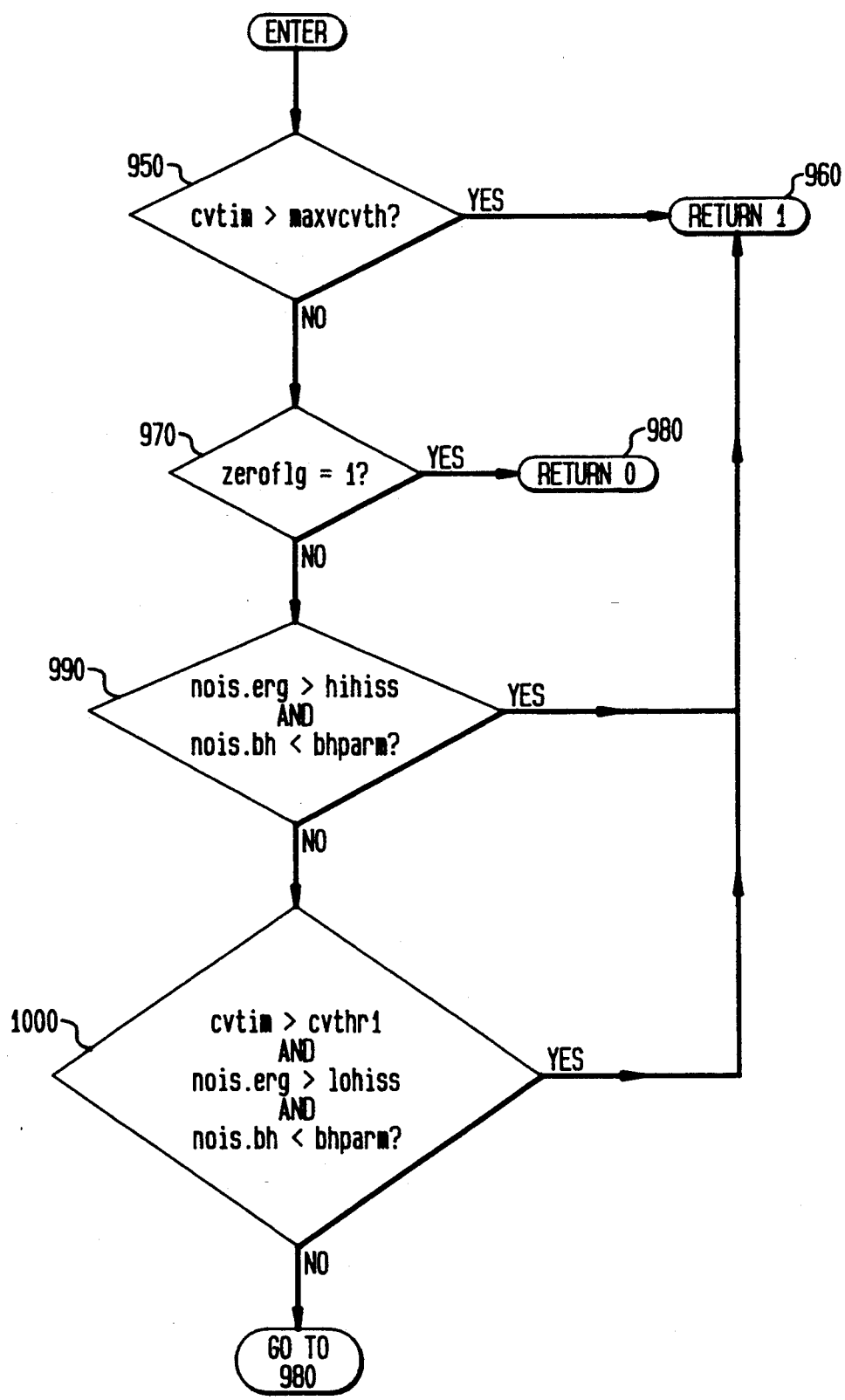

FIG. 3G shows a flowchart for module qdecide(). This module makes a quick decision at the beginning of voice as to whether the telephone call was answered by an answering machine. Upon entry to this module, control is transferred to box 950 of FIG. 3G. At box 950 of FIG. 3G, the program determines whether cvtim is very long, i.e., the program determines whether cvtim is larger than maxcvth. If so, control is transferred to box 960 of FIG. 3G to return 1, otherwise, control is transferred to box 970 of FIG. 3G.

At box 970 of FIG. 3G, the program determines whether zeroflg=1. If so, control is transferred to box 980 of FIG. 3G to return, otherwise, control is transferred to box 990 of FIG. 3G.

At box 990 of FIG. 3G, the program determines whether nois.erg>hihiss and nois.bh<bhparm. If so, there is a large amount of noise energy which occupies the whole window and control is transferred to box 960 of FIG. 3G, otherwise, control is transferred to box 1000 of FIG. 3G.

At box 1000 of FIG. 3G, the program determines whether cvtim>cvthr1 and noiserg>lohiss and nois.bh<bhparm. If so, there is a long time to connect and some hiss which occupies the whole window and control is transferred to box 960 of FIG. 3G, otherwise, control is transferred to box 980 of FIG. 3G.

Figure 3H:
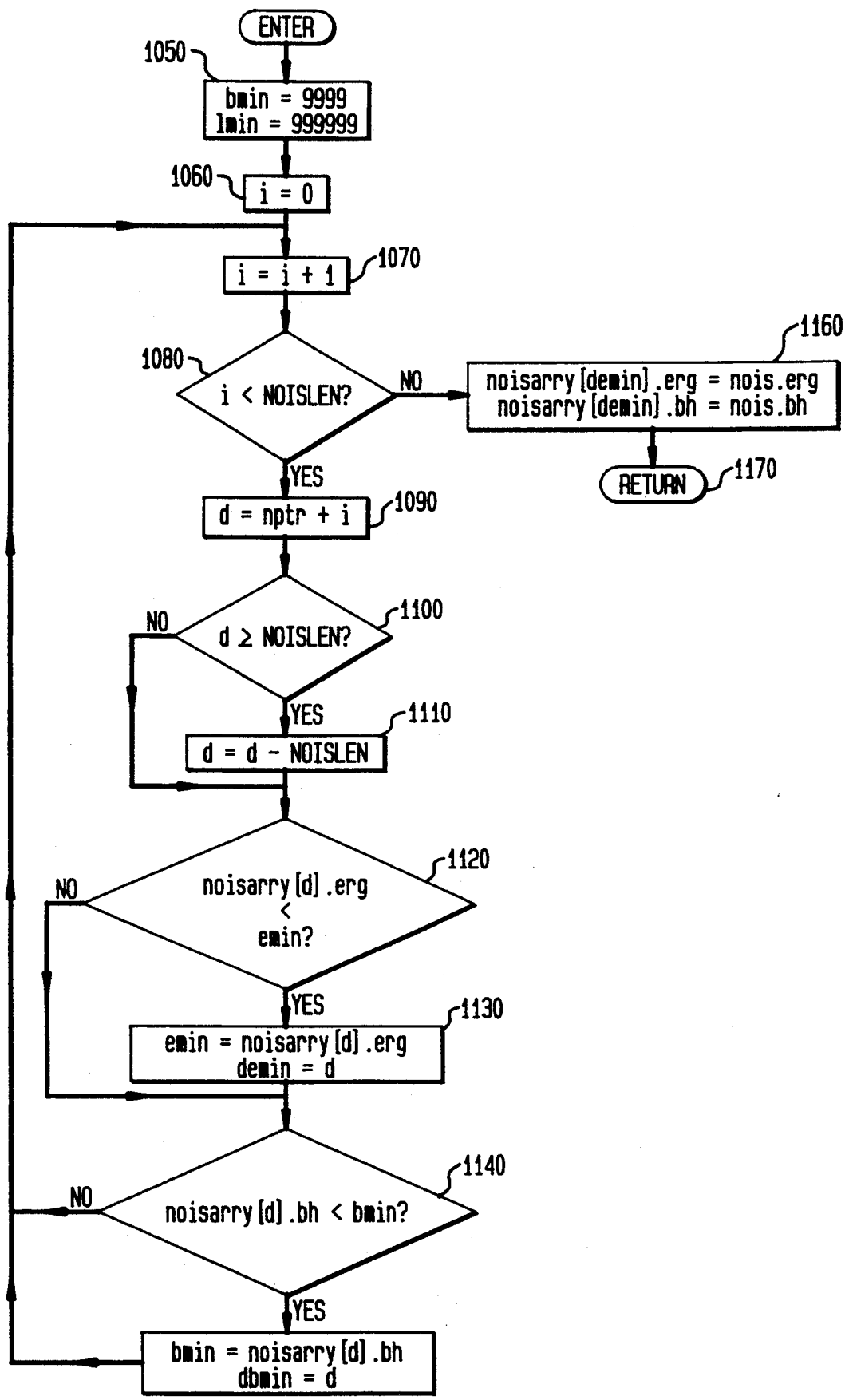

FIG. 3H shows a flowchart for module nois(nptr), where nptr is the pointer in the noise structure. This module analyzes the last NOISLEN windows and determines the minimum noisarry.erg and noisarry.bh. The block with the lowest energy is selected and the total energy and the number of frames below hiss for the block are stored in the structure. Upon entry to this module, control is transferred to box 1050 of FIG. 3H. At box 1050 of FIG. 3H, the program sets bmin=9999 and emin=999999. Then, control is transferred to box 1060 of FIG. 3H.

At box 1060 of FIG. 3H, the program sets i=0. Then, control is transferred to box 1070 of FIG. 3H.

At box 1070 of FIG. 3H, the program increments i, i.e., the program sets i=i+1. Then, control is transferred to box 1080 of FIG. 3H.

At box 1080 of FIG. 3H, the program determines whether i<NOISLEN. If so, control is transferred to box 1090 of FIG. 3H, otherwise, control is transferred to box 1160 of FIG. 3H.

At box 1090 of FIG. 3H, the program sets d=nptr+i. Then control is transferred to box 1100 of FIG. 3H.

At box 1100 of FIG. 3H, the program determines whether d≧NOISLEN. If so, control is transferred to box 1110 of FIG. 3H, otherwise, control is transferred to box 1120 of FIG. 3H.

At box 1110 of FIG. 3H, the program sets d=d−NOISLEN. Then, control is transferred to box 1120 of FIG. 3H.

At box 1120 of FIG. 3H, the program determines whether noisarry[d].erg<emin. If so, control is transferred to box 1130 of FIG. 3H, otherwise, control is transferred to box 1140 of FIG. 3H.

At box 1130 of FIG. 3H, the program sets emin=-noisarry[d].erg and demin=d. Then, control is transferred to box 1140 of FIG. 3H.

At box 1140 of FIG. 3H, the program determines whether noisarry[d].bh<bmin. If so, control is transferred to box 1150 of FIG. 3H, otherwise, control is transferred to box 1070 of FIG. 3H.

At box 1150 of FIG. 3H, the program sets bmin=-noisarry[d].bh and dbmin=d. Then, control is transferred to box 1070 of FIG. 3H.

At box 1160 of FIG. 3H, the program sets noisarry[demin].erg=nois.erg and noisarry[demin].bh. Then, control is transferred to box 1170 of FIG. 3H to return.

Figure 3I:
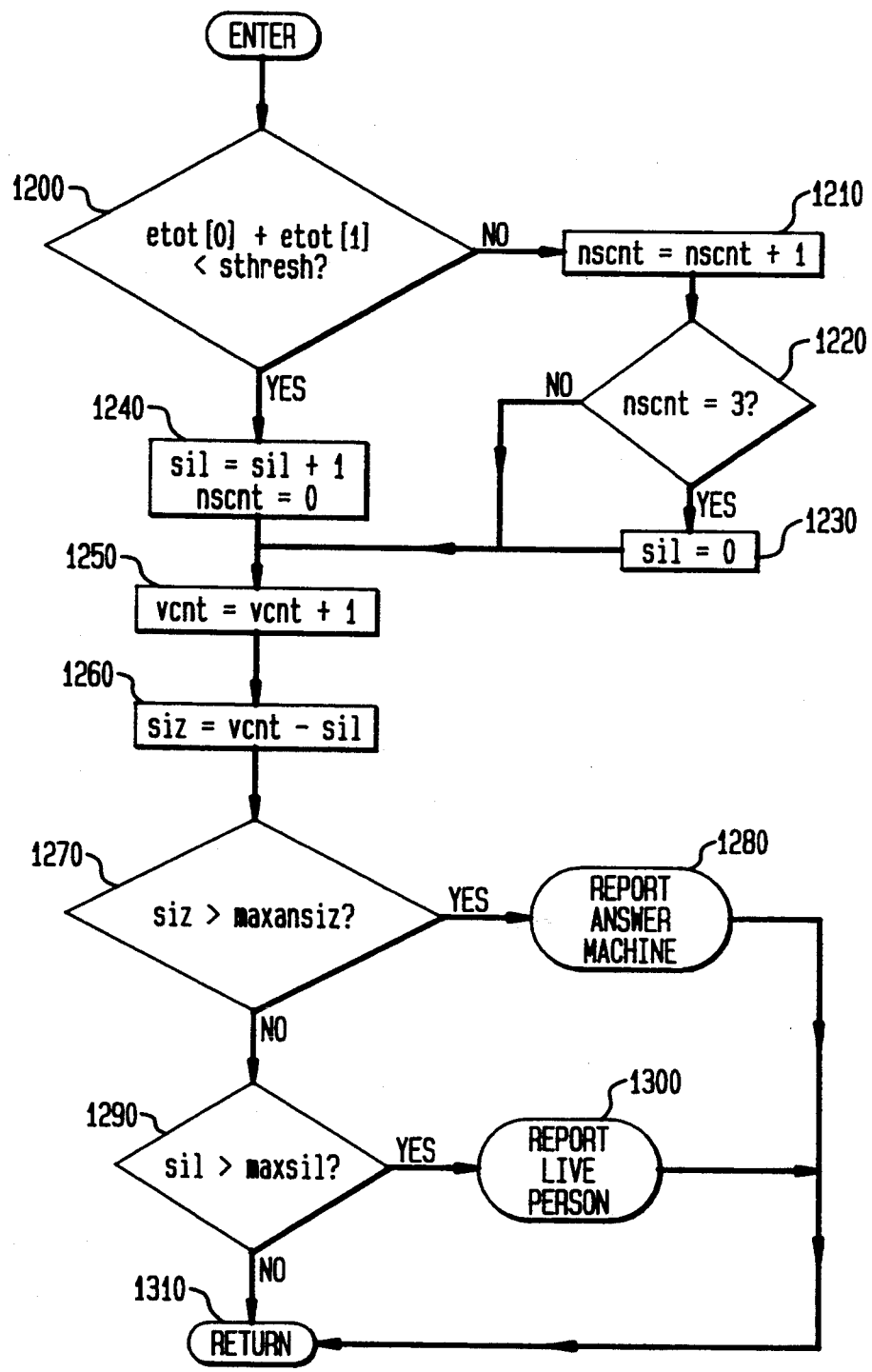

FIG. 3I shows a flowchart for module nextvoic(). This module analyzes a frame after voice has already been detected. Upon entry to this module, control is transferred to box 1200 of FIG. 3I. At box 1200 of FIG.

3I, the program determines whether there is silence now, i.e., the program determines whether etot[0-]+etot[1]<sthresh. If so, control is transferred to box 1240 of FIG. 3I, otherwise, control is transferred to box 1210 of FIG. 3I.

At box 1210 of FIG. 3I, the program increments the non-silence counter, i.e., the program sets nscnt=nscnt+1. Then, control is transferred to box 1220 of FIG. 3I.

At box 1220 of FIG. 3I, the program determines whether there have been 3 frames of silence, i.e., the program determines whether nscnt=3. If so, control is transferred to box 1250 of FIG. 3I, otherwise, control is transferred to box 1230 of FIG. 3I.

At box 1230 of FIG. 3I, the program sets sil=0. Then, control is transferred to box 1250 of FIG. 3I.

At box 1240 of FIG. 3I, the program increments the silence counter and resets the non-silence counter to 0, i.e., the program sets sil=sil+1 and nscnt=0. Then, control is transferred to box 1250 of FIG. 3I.

At box 1250 of FIG. 3I, the program increments the voice counter, i.e., the program sets vcnt=vcnt+1. Then, control is transferred to box 1260 of FIG. 3I.

At box 1260 of FIG. 3I, the program sets siz=vcnt−sil, the length of the voice. Then, control is transferred to box 1270 of FIG. 3I.

At box 1270 of FIG. 3I, the program determines whether siz>maxansiz. If so, the voice exceeds a predetermined length and control is transferred to box 1280 of FIG. 3I, otherwise, control is transferred to box 1290 of FIG. 3I.

At box 1280 of FIG. 3I, the program reports detection of an answering machine to host computer 30. Then, control is transferred to box 1310 of FIG. 3I to return.

At box 1290 of FIG. 3I, the program determines whether sil>maxsil. If so, there is a long silence after detecting voice and control is transferred to box 1300 of FIG. 3I, otherwise, control is transferred to box 1310 of FIG. 3I to return.

At box 1300 of FIG. 3I, the program reports detection of a live person to host computer 30. Then, control is transferred to box 1310 of FIG. 3I to return.

As should be clear to those of ordinary skill in the art, the embodiment of the present invention which was described in detail above is a detector which analyzes an input signal and, in response thereto, generates an identifier signal for use by another apparatus such as host computer 30. For example, the another apparatus can be an interactive system which can transmit voice signals to a person in the form of information and queries and can receive responses from the person in the form of various combinations of DTMF digits which are conveniently available from a Touch Tone telephone, In such a system, embodiments of the present invention advantageously provide detection as to whether a telephone call has been answered by an answering machine.

Those skilled in the art recognize that further embodiments of the present invention may be made without departing from its teachings. For example, an embodiment of the present invention may be fabricated without utilizing click detector 1020 and click analyzer 1110. In light of the above, it should be clear to those of ordinary skill in the art how to fabricate such an embodiment by excluding references to click detection in determining cvtim. Further, it should be clear to those of ordinary skill in the art that an embodiment of the present invention may be fabricated wherein noise detector 1080 and/or silence analyzer 1130 may receive telephone signal 1010 as input and wherein noise detector 1080 and/or silence analyzer 1130 stores its respective output information in store 1060 directly, i.e., without waiting for a signal from controller means 1070.

What is claimed is:

1. An answering machine detector for determining whether a telephone call has been answered by an answering machine or by a live person, the answering machine detector comprising:
   means for detecting a first measure of a length of time between the time the telephone call is answered and the time of first voice response; and
   means for generating a signal indicating that the telephone call was answered by the answering machine if the first measure of a length of time is greater than a predetermined time-to-answer length.

2. The answering machine detector of claim 1 which further comprises means for detecting a second measure of a length of time of the first voice response; and
   means for generating a signal indicating that the telephone call was answered by the answering machine if the second measure of a length of time exceeds an answer size time length.

3. The answering machine detector of claim 2 which further comprises means for adapting the answer size time length depending on the value of the first measure of a length of time.

4. The answering machine detector of claim 3 which further comprises means for determining a measure of a length of silence which occurs during the first voice response; and
   means for generating a signal indicating that the telephone call was answered by a live person if the measure of a length of silence exceeds a predetermined amount.

5. An answering machine detector for determining whether a telephone call has been answered by an answering machine or by a live person, the answering machine detector comprising:
   means for detecting a first measure of a length of time between the time the telephone call is answered and the time of first voice response;
   means for determining a measure of noise which occurs before the time of the first voice response; and
   means for generating a signal indicating that the telephone call was answered by the answering machine if the measure of noise has first predetermined characteristics or if the measure of noise has second predetermined characteristics and the first measure of a length of time is greater than a predetermined time-to-answer time length.

6. A method for determining whether a telephone call has been answered by an answering machine or by a live person, the method comprising the steps of:
   detecting the length of time between the time the telephone call is answered and the time of first voice response;
   generating a signal indicating that the telephone call was answered by the answering machine if the length of time is greater than a predetermined answer time length;
   detecting the length of time of the first voice response; and
   generating a signal indicating that the telephone call was answered by the answering machine if the length of time of the first voice response exceeds an adaptive answer size time length.

7. An answering machine detector for determining whether a telephone call has been answered by an answering machine or by a live person, the answering machine detector comprising:

a click detector means, responsive to a telephone signal generated during a telephone call, for detecting a click in a predetermined period of time referred to as a frame and for storing a click indication thereof in a storage means;

a ring detector means, responsive to the telephone signal, for detecting whether a ring event started, continues, or ended in the frame and for storing a ring indication thereof in the storage means;

a voice detector means, responsive to the telephone signal, for detecting whether a voice event occurred in the frame and for storing a voice indication thereof in the storage means;

an energy detector means, responsive to the telephone signal, for: (a) determining a measure of the total energy of the telephone signal in the frame and a measure of energy concentration of the signal referred to as broad; (b) storing the measures in the storage means; and (c) transmitting a signal to a controller means;

wherein the controller means is apparatus, responsive to the signal from the energy detector means, for: (a) obtaining the voice indication from the storage means and, if a voice event occurred, transmitting a signal to a voice analyzer means; (b) obtaining the ring indication from the storage means and, if a ring event started, continues, or ended in the frame, transmitting a signal to a ring analyzer means; (c) if the frame is not inside a ring event or a voice event, transmitting a signal to a noise detector means; (d) obtaining the click indication from the storage means and, if a click occurred in the frame, transmitting a signal to a click analyzer means; (e) if the ring indication does not indicate that a ring event started in the frame, transmitting a signal to an answer analyzer means; and (f) transmitting a signal to a silence analyzer means; wherein:

the noise detector means comprises means, responsive to the signal from the controller means and information obtained from the storage means, for detecting whether the telephone signal during the frame is noise and, if so, for storing noise information in the storage means;

the ring analyzer means comprises means, responsive to the signal from the controller means and information obtained from the storage means, for storing an indication of the length of a ring event in the storage means;

the click analyzer means comprises means, responsive to the signal from the controller means and information obtained from the storage means, for storing an indication of the time a click was detected in the storage means;

the answer analyzer means comprises means, responsive to the signal from the controller means and information obtained from the storage means, for detecting an indication of the time at which the telephone call is answered and for storing the indication of the time in the storage means;

the silence analyzer means comprises means, responsive to the signal from the controller means and information obtained from the storage means, for detecting silence, for determining an indication of the time at which a predetermined time length of silence occurred, and for storing the indication of the time in the storage means; and the voice analyzer means comprises means, responsive to the signal from the controller means and information obtained from the storage means, for determining whether the frame is the first frame in which a voice event has occurred and, if so, for transmitting a signal to an on-first voice analyzer means and, if not, for transmitting a signal to an after-first voice analyzer means; wherein:

the on-first voice analyzer means comprises means, responsive to the signal from the controller means and information obtained from the storage means, for detecting whether the telephone call was answered by an answering machine and, if so, for transmitting a signal to a reporter means; and the after-first voice analyzer means comprises means, responsive to the signal from the controller means and information obtained from the storage means, for determining whether the telephone call was answered by an answering machine or a live person and for transmitting a signal indicative thereof to the reporter means;

wherein the reporter means comprises means, responsive to signals from the on-first voice analyzer means and the after-first voice analyzer means, for generating a signal indicating whether the telephone call was answered by an answering machine or by a live person.

8. The answering machine detector of claim 7 wherein the answer analyzer means for detecting the indication of the time at which the telephone call is answered comprises means for the detecting the frame at which the measure of total energy is above a predetermined answer threshold after a ring-off event.

9. The answering machine detector of claim 7 wherein the silence analyzer means comprises means for detecting a frame at which the measure of total energy is below a predetermined silence threshold and means for counting such consecutive frames.

10. The answering machine detector of claim 7 wherein the noise detector means comprises means for detecting that the telephone signal is noise by determining: (a) whether the measure of total energy is less than a first predetermined threshold or (b) whether the measure of total energy is greater than a second predetermined threshold or broad is greater than a predetermined broad threshold.

11. The answering machine detector of claim 7 wherein the ring analyzer means comprises means for detecting the time at which a ring-on event occurred and the time at which a ring-off event occurred and for determining the indication of the length of a ring event from the difference thereof.

12. The answering machine detector of claim 7 wherein the on-first voice analyzer means comprises means for detecting the length of time between the time the telephone call is answered and the time of first voice response and for transmitting the signal to the reporter means indicating that the telephone call was answered by the answering machine if the length of time is greater than a predetermined answer time length.

13. The answering machine detector of claim 12 wherein the after-first voice analyzer means comprises means for detecting the length of time of the first voice response and for transmitting the signal to the reporter means indicating that the telephone call was answered by the answering machine if the length of time of the first voice response exceeds an adaptive answer size time length.

14. A method for determining whether a telephone call has been answered by an answering machine or by a live person, the method comprising the steps of:

responsive to a telephone signal generated during a telephone call: (a) detecting a click in a predetermined period of time referred to as a frame and storing a click indication thereof; (b) detecting whether a ring event started, continues, or ended in the frame and storing a ring indication thereof; (c) detecting whether a voice event occurred in the frame and storing a voice indication thereof; (d) (i) determining a measure of the total energy of the telephone signal in the frame and a measure of energy concentration of the signal referred to as broad and (ii) storing the measures;

responsive to the end of a frame: (a) obtaining the voice indication and, if a voice event occurred, transferring to a voice analyzing step; (b) obtaining the ring indication and, if a ring event started, continues, or ended in the frame, transferring to a ring analyzing step; (c) if the frame is not inside a ring event or a voice event, transferring to a noise detecting step; (d) obtaining the click indication from the storage means and, if a click occurred in the frame, transferring to a click analyzing step; (e) if the ring indication does not indicate that a ring event started in the frame, transferring to an answer analyzing step; and (f) transferring to a silence analyzing step; wherein:

the noise detecting step comprises the steps of, responsive to stored information, detecting whether the telephone signal during the frame is noise and, if so, storing noise information;

the ring analyzing step comprises the steps of, responsive to stored information, storing an indication of the length of a ring event;

the click analyzing step comprises the steps of, responsive to stored information, storing an indication of the time a click was detected;

the answer analyzing step comprises the steps of, responsive to stored information, detecting an indication of the time at which the telephone call is answered and storing the indication of the time;

the silence analyzing step comprises the steps of, responsive to stored information, detecting silence, determining an indication of the time at which a predetermined time length of silence occurred, and storing the indication of the time; and the voice analyzing step comprises the steps of, responsive to stored information, determining whether the frame is the first frame in which a voice event has occurred and, if so, transferring to an on-first voice analyzing step and, if not, transferring to an after-first voice analyzing step; wherein:

the on-first voice analyzing step comprises the steps of, responsive to stored information, detecting whether the telephone call was answered by an answering machine and, if so, for transferring an indication thereof to a reporting step; and the after-first voice analyzing step comprises the steps of, responsive to stored information, determining whether the telephone call was answered by an answering machine or a live person and for transferring an indication thereof to the reporting step;

wherein the reporting step comprises the steps of, responsive to indications from the on-first voice analyzing step and the after-first voice analyzing step, generating a signal indicating whether the telephone call has been answered by an answering machine or by a live person.

15. An answering machine detector for determining whether a telephone call has been answered by an answering machine or by a live person, the answering machine detector comprising:

a ring detector means, responsive to the telephone signal, for detecting whether a ring event started, continues, or ended in a predetermined period of time referred to as a frame and for storing a ring indication thereof in the storage means;

a voice detector means, responsive to the telephone signal, for detecting whether a voice event occurred in the frame and for storing a voice indication thereof in the storage means;

an energy detector means, responsive to the telephone signal, for: (a) determining a measure of the total energy of the telephone signal in the frame and a measure of energy concentration of the signal referred to as broad; (b) storing the measures in the storage means; and (c) transmitting a signal to a controller means;

wherein the controller means is apparatus, responsive to the signal from the energy detector means, for: (a) obtaining the voice indication from the storage means and, if a voice event occurred, transmitting a signal to a voice analyzer means; (b) obtaining the ring indication from the storage means and, if a ring event started, continues, or ended in the frame, transmitting a signal to a ring analyzer means; (c) if the frame is not inside a ring event or a voice event, transmitting a signal to a noise detector means; (d) if the ring indication does not indicate that a ring event started in the frame, transmitting a signal to an answer analyzer means; and (e) transmitting a signal to a silence analyzer means; wherein:

the noise detector means comprises means, responsive to the signal from the controller means and information obtained from the storage means, for detecting whether the telephone signal during the frame is noise and, if so, for storing noise information in the storage means;

the ring analyzer means comprises means, responsive to the signal from the controller means and information obtained from the storage means, for storing an indication of the length of a ring event in the storage means;

the answer analyzer means comprises means, responsive to the signal from the controller means and information obtained from the storage means, for detecting an indication of the time at which the telephone call is answered and for storing the indication of the time in the storage means;

the silence analyzer means comprises means, responsive to the signal from the controller means and information obtained from the storage means, for detecting silence, for determining an indication of the time at which a predetermined time length of silence occurred, and for storing the indication of the time in the storage means; and the voice analyzer means comprises means, responsive to the signal from the controller means and information obtained from the storage means, for determining whether the frame is the first frame in which a voice event has occurred and, if so, for transmitting a signal to an on-first voice analyzer means and, if not, for transmitting a signal to an after-first voice analyzer means; wherein:

the on-first voice analyzer means comprises means, responsive to the signal from the controller means and information obtained from the storage means, for detecting whether the telephone call was answered by an answering machine and, if so, for transmitting a signal to a reporter means; and the after-first voice analyzer means comprises means, responsive to the signal from the controller means and information obtained from the storage means, for determining whether the telephone call was answered by an answering machine or a live person and for transmitting a signal indicative thereof to the reporter means;

wherein the reporter means comprises means, responsive to signals from the on-first voice analyzer means and the after-first voice analyzer means, for generating a signal indicating whether the telephone call was answered by an answering machine or by a live person.

* * * * *